(12) United States Patent
Zou et al.

(10) Patent No.: US 12,242,134 B2
(45) Date of Patent: Mar. 4, 2025

(54) OPTICAL SYSTEM, LENS MODULE, AND ELECTRONIC DEVICE

(71) Applicant: JIANGXI JINGCHAO OPTICAL CO., LTD., Jiangxi (CN)

(72) Inventors: Jinhua Zou, Jiangxi (CN); Binbin Liu, Jiangxi (CN); Hairong Zou, Jiangxi (CN)

(73) Assignee: JIANGXI JINGCHAO OPTICAL CO., LTD., Jiangxi (CN)

( * ) Notice: Subject to any disclaimer, the term of this patent is extended or adjusted under 35 U.S.C. 154(b) by 697 days.

(21) Appl. No.: 17/459,022

(22) Filed: Aug. 27, 2021

(65) Prior Publication Data

US 2021/0389557 A1    Dec. 16, 2021

Related U.S. Application Data

(63) Continuation of application No. PCT/CN2019/103897, filed on Aug. 31, 2019.

(51) Int. Cl.
*G02B 9/62* (2006.01)
*G02B 13/00* (2006.01)
*G02B 5/20* (2006.01)

(52) U.S. Cl.
CPC .......... *G02B 9/62* (2013.01); *G02B 13/0045* (2013.01); *G02B 5/208* (2013.01)

(58) Field of Classification Search
CPC ....... G02B 9/62; G02B 13/0045; G02B 5/208
USPC ........................................ 359/713
See application file for complete search history.

(56) References Cited

U.S. PATENT DOCUMENTS

| | | |
|---|---|---|
| 2004/0051964 A1 | 3/2004 | Endo et al. |
| 2015/0022905 A1 | 1/2015 | Shinohara et al. |
| 2019/0243102 A1 | 8/2019 | Chen et al. |

FOREIGN PATENT DOCUMENTS

| | | |
|---|---|---|
| CN | 105676422 A | 6/2016 |
| CN | 105911675 A | 8/2016 |
| CN | 106338815 A | 1/2017 |
| CN | 106405794 A | 2/2017 |
| CN | 106772948 A | 5/2017 |
| CN | 106918898 A | 7/2017 |
| CN | 107065125 A | 8/2017 |
| CN | 108319003 A | 7/2018 |

(Continued)

OTHER PUBLICATIONS

The International Search Report issued in corresponding International Application No. PCT/CN2019/103897, mailed May 20, 2020.

(Continued)

*Primary Examiner* — Wyatt A Stoffa
*Assistant Examiner* — Grant A Gagnon
(74) *Attorney, Agent, or Firm* — HAUPTMAN HAM, LLP

(57) ABSTRACT

An optical system, a lens module, and an electronic device are provide. The optical system includes, in order from an object side to an image side along an optical axis, a first lens with a negative refractive power, a second lens with a positive refractive power, a third lens with a negative refractive power, a fourth lens with a refractive power, a fifth lens with a positive refractive power, and a sixth lens with a negative refractive power. An object-side surface of the fifth lens has at least one inflection point. At least one of an object-side surface and an image-side surface of the sixth lens has at least one inflection point. The optical system satisfies the following expression: $-9 < f4/|f1| < 3.5$.

20 Claims, 12 Drawing Sheets

(56) References Cited

FOREIGN PATENT DOCUMENTS

| CN | 108508577 A | 9/2018 |
|----|-------------|--------|
| CN | 208432781 U | 1/2019 |
| CN | 208752296 U | 4/2019 |
| CN | 210775999 U | 6/2020 |

OTHER PUBLICATIONS

First Office Action issued in corresponding CN application No. 201910819911.X dated Nov. 16, 2024.

OPTICAL SYSTEM, LENS MODULE, AND ELECTRONIC DEVICE

CROSS-REFERENCE TO RELATED APPLICATIONS

The present application is a continuation of International Application No. PCT/CN2019/103897, filed on Aug. 31, 2019, the disclosure of which is hereby incorporated by reference in its entirety.

TECHNICAL FIELD

The present disclosure relates to the field of optical imaging technology, and particularly to an optical system, a lens module, and an electronic device.

BACKGROUND

With the rapid development of smartphone-related technologies, shooting has become one of the most important functions of a smartphone besides communications. A large wide-angle optical lens can achieve an amazing self-portrait effect with optimized software algorithms, which brings an excellent experience to consumers. With the advancement of semiconductor manufacturing technology, a pixel size of photosensitive elements has been decreased, higher pixels and higher image quality are the development tendency of optical systems.

In order to meet this trend, it has imposed increased requirements on wide-angle lens in a wide-angle, miniaturization, as well as high imaging quality. Currently, a optical system with four-element or five-element optical lenses can meet requirements of miniaturization, but cannot regular a balance of the total refractive power of the lenses, which easily causes off-axis aberrations to be too large and difficult to correct, resulting in a low efficiency of the electronic photosensitive element in receiving light emitted by an object, which affects imaging quality.

SUMMARY

According to the present disclosure, an optical system is provided, which can meet the requirements of good imaging quality, miniaturization, and a large angle of view.

Technical solutions are provided blow to achieve at least one objective of the present disclosure.

In a first aspect, an optical system is provided. The optical system includes, in order from an object side to an image side along an optical axis, a first lens with a negative refractive power, a second lens with a positive refractive power, a third lens with a negative refractive power, a fourth lens with a refractive power, a fifth lens with a positive refractive power, and a sixth lens with a negative refractive power. The fifth lens has an object-side surface which is convex near the optical axis and concave near a periphery of the object-side surface of the fifth lens. The object-side surface of the fifth lens has at least one inflection point. The sixth lens has an object-side surface which is convex near the optical axis and concave near a periphery of the object-side surface of the sixth lens, and an image-side surface which is concave near the optical axis and convex near a periphery of the image-side surface of the sixth lens. At least one of the object-side surface and the image-side surface of the sixth lens has at least one inflection point. The optical system satisfies the following expression: $-9<f4/|f1|<3.5$. f1 represents an effective focal length of the first lens, f4 represents an effective focal length of the fourth lens. A surface shape and a refractive power of each lens of the first to sixth lenses can be rationally set to meet the requirements of good imaging quality, miniaturization, and a large angle of view. If the fourth lens has a negative refractive power, a field of view of a wide-angle lens can be it can be further enlarged. If the fourth lens has a positive refractive power, a total length of the wide-angle lens can be further shortened. An appropriate value of f4/|f1|, an appropriate refractive power distribution, and appropriate optical shapes of lenses are beneficial to enlarging the angle of view of the optical system.

In an implementation, the optical system satisfies the following expression: $1.7<\tan(HFOV)/SD11<2.6$. HFOV represents half of a maximum angle of view of the optical system, SD11 represents half of a clear aperture of an object-side surface of the first lens. The value of $\tan(HFOV)/SD11$ can be appropriately set to enable the optical system to have an enlarged field of view and a shorten overall length, so as to maintain the miniaturization of the optical system.

In an implementation, the optical system satisfies the following expression: $0.7<f2/f5<1.5$. f2 represents an effective focal length of the second lens, f5 represents an effective focal length of the fifth lens. If $f2/f5 \leq 0.7$, the refractive power of the second lens is insufficient, it is difficult to correct system coma. If $f2/f5 \geq 1.5$, aberration correction of the rear lens group will be excessive due to the strong refractive power of the second lens. An appropriate distribution of the optical refractive powers of the second lens and the fifth lens is beneficial to correcting a system aberration, especially to reducing the system coma, and to balancing a spherical aberration produced by a negative lens of the optical system.

In an implementation, the optical system satisfies the following expression: $0.5<f1/f6<1.5$. f1 represents an effective focal length of the first lens, f6 represents an effective focal length of the sixth lens. An appropriate distribution of the effective focal lengths of the first lens and the sixth lens allows the field of view to be further increased and a distortion to be effectively corrected.

In an implementation, the optical system satisfies the following expression: $0.8<CT2/(T12+T23)<1.6$. CT2 represents a thickness of the second lens on the optical axis, T12 represents a distance between the first lens and the second lens on the optical axis, and T23 represents a distance between the second lens and the third lens on the optical axis. The value of $CT2/(T12+T23)$ can be appropriately set to provide a sufficient space for assembling the three lenses, so as to avoid collision between the first lens and the second lens or collision between the second lens and the third lens. In addition, shortening CT2, T12, and T23 is conducive to the thinning of the wide-angle lens, and it can also prevent the value from being too small for assembly and increasing the sensitivity of the optical system.

In an implementation, the optical system satisfies the following expression: $0.5<vd6-vd3<4.5$. vd6 represents an Abbe number of the sixth lens, and vd3 represents an Abbe number of the third lens. A material of the lens materials can be appropriately selected to effectively correct the chromatic aberration of the wide-angle lens and improve the imaging clarity of the optical lens, thereby improving the imaging quality of the wide-angle lens.

In an implementation, the optical system satisfies the following expression: $1.2<R12/R13<2.5$. R12 represents a radius of curvature of the object-side surface of the sixth lens, and R13 represents a radius of curvature of the image-side surface of the sixth lens. If R12/R13 ≤ 1.2, the object side of the sixth lens will be excessively bent, and the moldability will be poor, which will affect the manufacturing yield. If R12/R13 ≥ 2.5, the surface of the sixth lens is too smooth, it is difficult to correct aberrations, and the relative brightness of the edge field of view is low, which affects the imaging quality of the wide-angle lens. By adjusting the radius of curvature of the sixth lens, the processing feasibility of the sixth lens can be ensured, while the spherical aberration and astigmatism can be effectively corrected, thereby improving the imaging quality of a camera.

In an implementation, the optical system satisfies the following expression: CT5/|SAG51|>1. CT5 represents a thickness of the fifth lens on the optical axis, SAG51 represents an offset on the optical axis between a vertex on the optical axis of the object-side surface of the fifth lens and the object-side surface of the fifth lens at a maximum effective radius thereof. By setting the value of CT5/|SAG51| appropriately, the lens is constained to have appropriate lens shapes, which is beneficial to manufacturing and molding, and reducing defects of poor molding.

In an implementation, the optical system satisfies the following expression: 0.2<(CT1+CT3+CT4)/TTL<0.3. CT1 represents a center thickness of the first lens on the optical axis, CT3 represents a center thickness of the third lens on the optical axis, CT4 represents a center thickness of the fourth lens on the optical axis, and TTL represents a distance from an object-side surface of the first lens to an image plane of the optical system on the optical axis. An appropriate configuration of the thicknesses of the first lens, the third lens, and the fourth lens is beneficial to lowering the sensitivity of the system while maintaining the miniaturization of the optical system.

In a second aspect, a lens module is further provided. The lens module includes a lens barrel, the optical system in the first aspect. The first to sixth lenses of the optical system are received in the lens barrel. The first to sixth lenses of the optical system are received in the lens module, such that the lens module can meet the requirements of good imaging quality, miniaturization, and a large angle of view.

In a third aspect, an electronic device is further provided. The electronic device includes a housing, an electronic photosensitive element, the lens module in the second aspect. The lens module and the electronic photosensitive element are received in the housing. The electronic photosensitive element is disposed on an image plane of the optical system and configured to convert light passing through the first to sixth lenses and incident on the electronic photosensitive element into an electrical signal of an image. The lens module described in the second aspect is installed in an electronic device, such that thinness and miniaturization of the electronic device are achieved, and is capable of shooting at a large angle and having good imaging quality.

BRIEF DESCRIPTION OF THE DRAWINGS

To describe the technical solutions in the implementations of the present disclosure or the related art more clearly, the following briefly introduces the accompanying drawings required for describing the implementations or the related art. Apparently, the accompanying drawings in the following description illustrate some implementations of the present disclosure. Those of ordinary skill in the art may also obtain other drawings based on these accompanying drawings without creative efforts.

FIG. 1b illustrates a longitudinal spherical aberration curve, an astigmatic field curve, and a distortion curve of the optical system of FIG. 1a.

FIG. 2b illustrates a longitudinal spherical aberration curve, an astigmatic field curve, and a distortion curve of the optical system of FIG. 2a.

FIG. 3b illustrates a longitudinal spherical aberration curve, an astigmatic field curve, and a distortion curve of the optical system of FIG. 3a.

FIG. 4b illustrates a longitudinal spherical aberration curve, an astigmatic field curve, and a distortion curve of the optical system according to the optical system of FIG. 4a.

FIG. 5b illustrates a longitudinal spherical aberration curve, an astigmatic field curve, and a distortion curve of the optical system of FIG. 5a.

FIG. 6b illustrates a longitudinal spherical aberration curve, an astigmatic field curve, and a distortion curve of the optical system of FIG. 6a.

DETAILED DESCRIPTION OF ILLUSTRATED IMPLEMENTATIONS

Figure 1A:
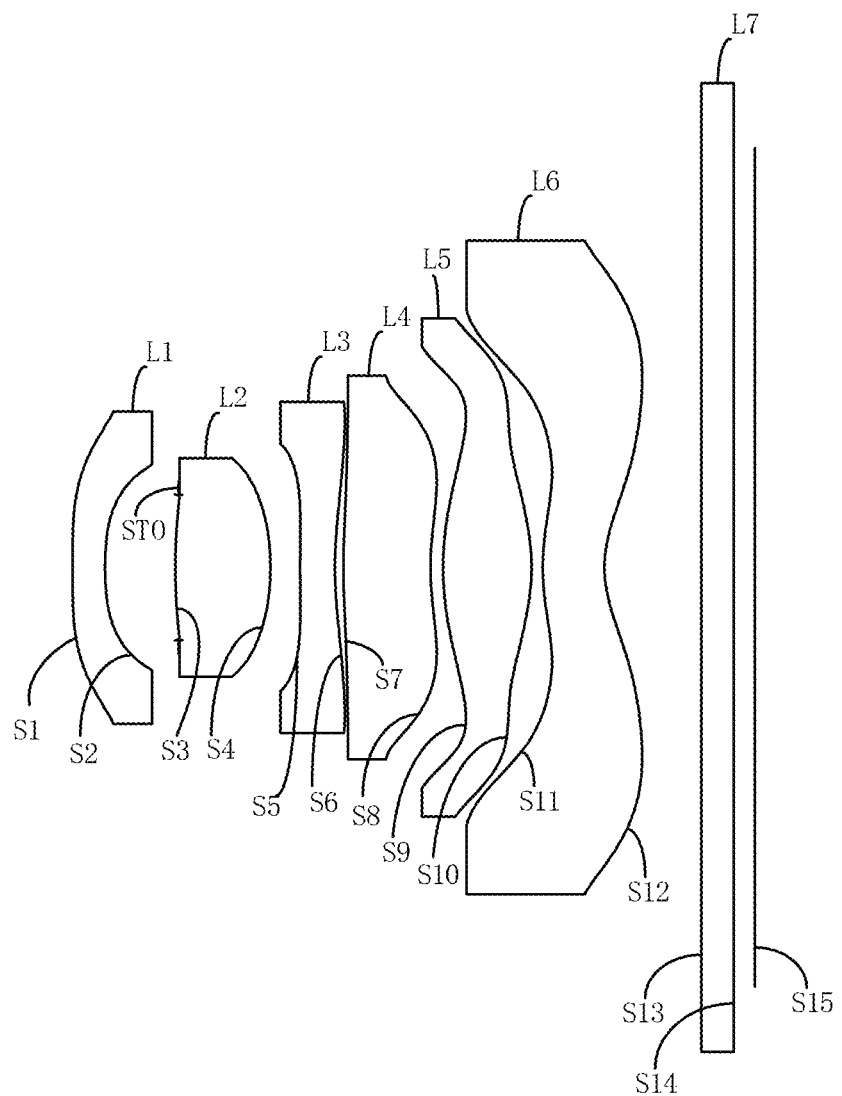
FIG. 1a is a schematic structural view of an optical system according to an implementation.

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

A lens module is provided. The lens module includes a lens barrel and an optical system provided in implementations of the disclosure. The first to sixth lenses of the optical system are received in the lens barrel. The lens module can be an independent lens of a digital camera or an imaging module integrated on an electronic device such as a smart phone. With the first to sixth lenses installed in the optical system, a large field angle and miniaturization of the lens module are achieved.

An electronic device is further provided. The electronic device includes a housing, an electronic photosensitive element, and the lens module in the implementations of the present disclosure. The lens module and the electronic photosensitive element are received in the housing. The electronic photosensitive element is disposed on an image plane of the optical system and configured to convert light passing through the first to sixth lenses and incident on the electronic photosensitive element into an electrical signal of an image. The electronic photosensitive element may be a complementary metal oxide semiconductor (CMOS) or a charge-coupled device (CCD). The electronic device can be a smart phone, a personal digital assistant (PDA), a tablet computer, a smart watch, a drone, an e-book reader, a driving recorder, a wearable device, etc. In the present disclosure, the lens module is installed in the electronic device to realize a large field angle and miniaturization of the electronic device.

The implementations of the present disclosure provide an optical system including, for example, six lenses, namely, a first lens, a second lens, a third lens, a fourth lens, a fifth lens, and a sixth lens. The first to sixth lenses are arranged in order from an object side to an image side along an optical axis of the optical system. In the first to sixth lenses, there is an air gap between any two adjacent lenses.

The first lens has a negative refractive power. The second lens has a positive refractive power. The third lens has a negative refractive power. The fourth lens has a refractive power. The fifth lens has a positive refractive power. The fifth lens has an object-side surface which is convex in a vicinity of the optical axis and concave in a vicinity of a periphery of the object-side surface of the fifth lens. The object-side surface of the fifth lens has at least one inflection point. The sixth lens has a negative refractive power. The sixth lens has an object-side surface which is convex in a vicinity of the optical axis and concave in a vicinity of a periphery of the object-side surface of the sixth lens, and an image-side surface which is concave near the optical axis and convex near a periphery of the image-side surface of the sixth lens. At least one of the object-side surface and the image-side surface of the sixth lens has at least one inflection point.

The optical system further includes a stop, which can be arranged at any position between the first lens and the sixth lens. For example, the stop can be arranged between the first lens and the second lens.

The optical system satisfies the following expression: $-9<f4/|f1|<3.5$. f1 represents an effective focal length of the first lens, f4 represents an effective focal length of the fourth lens. A surface shape and a refractive power of each lens of the first to sixth lenses can be rationally set to meet the requirements of good imaging quality, miniaturization, and a large angle of view of the optical system. When above conditions are met simultaneously, the refractive powers of the lenses are appropriately distributed and the surface shapes of the lenses are appropriately set, which is beneficial to enlargering the field of view of the optical system. If the fourth lens has a negative refractive power, a field of view of a wide-angle lens can be it can be further enlarged. If the fourth lens has a positive refractive power, a total length of the wide-angle lens can be further shortened.

In an implementation, the optical system satisfies the following expression: $1.7<\tan(HFOV)/SD11<2.6$. HFOV represents half of a maximum angle of view of the optical system, SD11 represents half of a clear aperture of an object-side surface of the first lens. The value of tan(HFOV)/SD11 can be appropriately set to enable the optical system to have an enlarged field of view and a shorten overall length, so as to maintain the miniaturization of the optical system.

In an implementation, the optical system satisfies the following expression: $0.7<f2/f5<1.5$. f2 represents an effective focal length of the second lens, f5 represents an effective focal length of the fifth lens. If $f2/f5 \leq 0.7$, the refractive power of the second lens is insufficient, it is difficult to correct system coma. If $f2/f5 \geq 1.5$, aberration correction of the rear lens group will be excessive due to the strong refractive power of the second lens. An appropriate distribution of the optical refractive powers of the second lens and the fifth lens is beneficial to correcting a system aberration, especially to reducing the system coma, and to balancing a spherical aberration produced by a negative lens of the optical system.

In an implementation, the optical system satisfies the following expression: $0.5<f1/f6<1.5$. f1 represents an effective focal length of the first lens, f6 represents an effective focal length of the sixth lens. An appropriate distribution of the effective focal lengths of the first lens and the sixth lens allows the field of view to be further increased and a distortion to be effectively corrected.

In an implementation, the optical system satisfies the following expression: $0.8<CT2/(T12+T23)<1.6$. CT2 represents a thickness of the second lens on the optical axis, T12 represents a distance between the first lens and the second lens on the optical axis, and T23 represents a distance between the second lens and the third lens on the optical axis. The value of CT2/(T12+T23) can be appropriately set to provide a sufficient space for assembling the three lenses, so as to avoid collision between the first lens and the second lens or collision between the second lens and the third lens. In addition, shortening CT2, T12, and T23 is conducive to the thinning of the wide-angle lens, and it can also prevent the value from being too small for assembly and increasing the sensitivity of the optical system.

In an implementation, the optical system satisfies the following expression: $0.5<vd6-vd3<4.5$. vd6 represents an Abbe number of the sixth lens, and vd3 represents an Abbe number of the third lens. A material of the lens can be appropriately selected to effectively correct the chromatic aberration of the wide-angle lens and improve the imaging clarity of the optical lens, thereby improving the imaging quality of the wide-angle lens.

In an implementation, the optical system satisfies the following expression: $1.2<R12/R13<2.5$. R12 represents a radius of curvature of the object-side surface of the sixth lens, and R13 represents a radius of curvature of the image-side surface of the sixth lens. By adjusting the radius of curvature of the sixth lens, the processing feasibility of the sixth lens can be ensured, while the spherical aberration and astigmatism can be effectively corrected, thereby improving the imaging quality of a camera. If $R12/R13 \leq 1.2$, the object side of the sixth lens will be excessively bent, and the moldability will be poor, which will affect the manufacturing yield. If $R12/R13 \geq 2.5$, the surface of the sixth lens is too smooth, it is difficult to correct aberrations, and the relative brightness of the edge field of view is low, which affects the imaging quality of the wide-angle lens.

In an implementation, the optical system satisfies the following expression: $CT5/|SAG51|>1$. CT5 represents a thickness of the fifth lens on the optical axis, SAG51 represents an offset on the optical axis between a vertex on the optical axis of the object-side surface of the fifth lens and the object-side surface of the fifth lens at a maximum effective radius thereof. By setting the value of CT5/|SAG51| appropriately, the lens is constained to have appropriate lens shapes, which is beneficial to manufacturing and molding, and reducing defects of poor molding.

In an implementation, the optical system satisfies the following expression: $0.2<(CT1+CT3+CT4)/TTL<0.3$. CT1 represents a center thickness of the first lens on the optical axis, CT3 represents a center thickness of the third lens on the optical axis, CT4 represents a center thickness of the fourth lens on the optical axis, and TTL represents a distance from an object-side surface of the first lens to an image plane of the optical system on the optical axis. An appropriate configuration of the thicknesses of the first lens, the third lens, and the fourth lens is beneficial to lowering the sensitivity of the system while maintaining the miniaturization of the optical system.

Figure 1B:
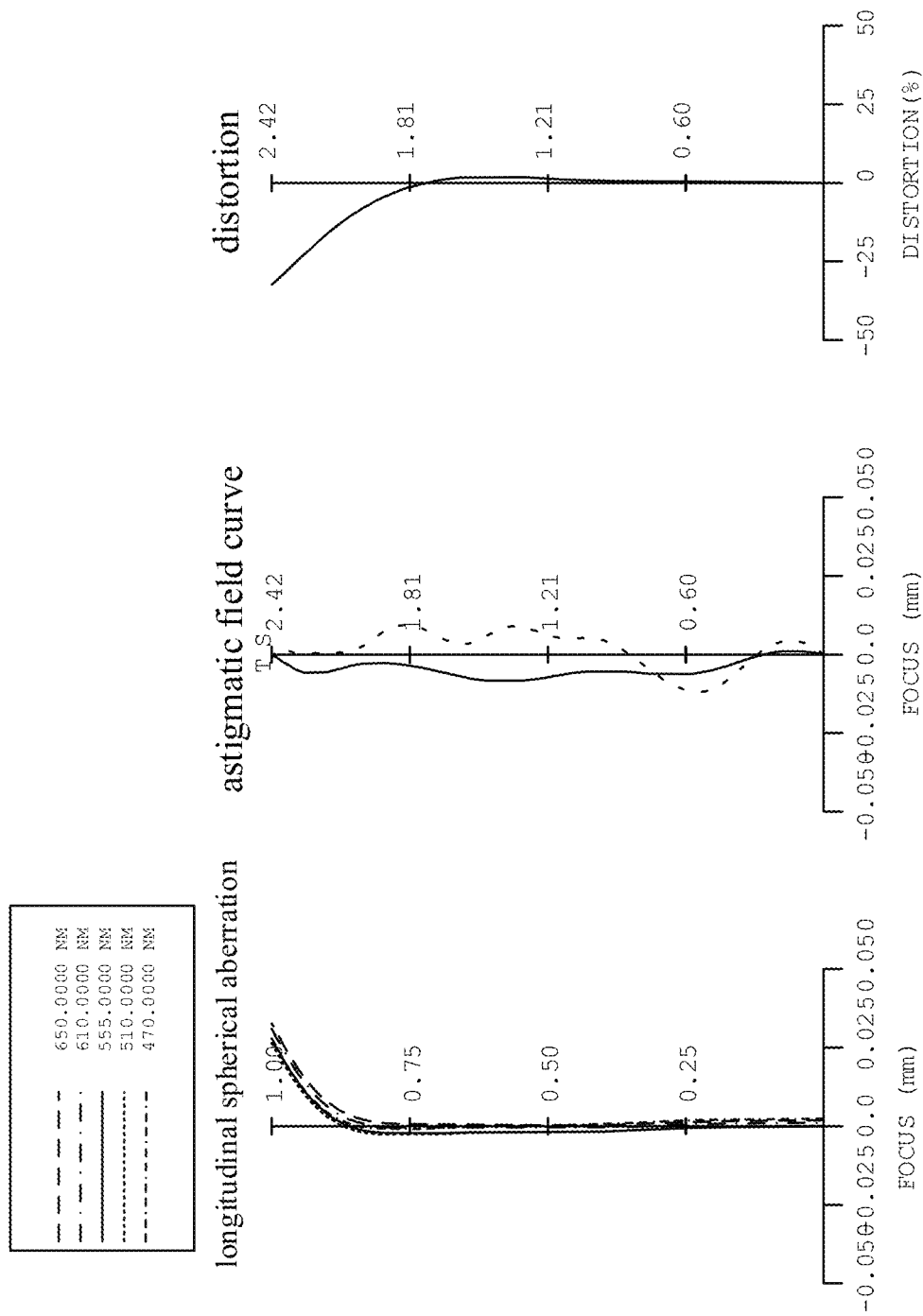

Referring to FIG. 1a and FIG. 1b, the optical system in this implementation includes, in order from the object side to the image side along the optical axis, the first lens L1, the second lens L2, the third lens L3, the fourth lens L4, the fifth lens L5, and the sixth lens L6.

The first lens L1 has a negative refractive power. The object-side surface S1 of the first lens L1 is convex. The image-side surface S2 of the first lens L1 is concave.

The second lens L2 has a positive refractive power. The object-side surface S3 of the second lens L2 is convex. The image-side surface S4 of the second lens L2 is convex.

The third lens L3 has a negative refractive power. The object-side surface S5 of the third lens L3 is convex near the optical axis and is concave near a periphery of the object-side surface of the third lens L3. The image-side surface S6 of the third lens L3 is concave near the optical axis and is convex near a periphery of the image-side surface S6 of the third lens L3.

In an implementation, each lens of the first to sixth lenses (L1 to L6) is made of plastic.

In addition, the optical system further includes a stop (ST0), an infrared cut-off filter L7, and an image plane S15. The ST0 is arranged between the first lens L1 and the second lens L2, and is adjacent to the second lens L2, for controlling the amount of light entering. In other implementations, the ST0 can also be disposed between two other adjacent lenses. The infrared cut-off filter L7 is disposed at an image side of the sixth lens L6 and has an object-side surface S13 and an image-side surface S14. The infrared cut-off filter L7 is used to filter out infrared light so that the light entering the image plane S15 is visible light, and the wavelength of visible light is 380 nm-780 nm. The infrared cut-off filter L7 is made of glass and can be coated thereon. The image plane S15 is an effective pixel area of the electronic photosensitive element.

Table 1a illustrates characteristics of the optical system in this implementation. Data in Table 1a is obtained based on light with a wavelength of 587.6 nm. Each of Y radius, thickness, and focal length is in units of millimeter (mm).

TABLE 1a

Optical system of FIG. 1a
EFL = 1.76, FNO = 2.45, HFOV = 63.79, TTL = 443

| Surface Number | Surface Name | Shape | Y Radius | Thickness | Material | Refractive Index | Abbe Number | Focal length |
|---|---|---|---|---|---|---|---|---|
| Object number | | Spherical | Infinity | Infinity | | | | |
| S1 | First lens | Aspherical | 50.000 | 0.211 | Plastic | 1.545 | 55.93 | −3.05 |
| S2 | | Aspherical | 1.609 | 0.478 | | | | |
| ST0 | Stop | Spherical | Infinity | −0.022 | | | | |
| S3 | Second lens | Aspherical | 2.977 | 0.617 | Plastic | 1.545 | 55.93 | 1.74 |
| S4 | | Aspherical | −1.293 | 0.193 | | | | |
| S5 | Third lens | Aspherical | 8.845 | 0.226 | Plastic | 1.661 | 20.37 | −3.96 |
| S6 | | Aspherical | 2.011 | 0.055 | | | | |
| S7 | Fourth lens | Aspherical | 3.240 | 0.566 | Plastic | 1.545 | 55.93 | −5.47 |
| S8 | | Aspherical | 1.458 | 0.082 | | | | |
| S9 | Fifth lens | Aspherical | 1.518 | 0.574 | Plastic | 1.545 | 55.93 | 1.22 |
| S10 | | Aspherical | −1.023 | 0.074 | | | | |
| S11 | Sixth lens | Aspherical | 1.326 | 0.400 | Plastic | 1.636 | 23.97 | −2.21 |
| S12 | | Aspherical | 0.604 | 0.629 | | | | |
| S13 | Infrared | Spherical | Infinity | 0.210 | Glass | 1.517 | 64.17 | |
| S14 | cut-off filter | Spherical | Infinity | 0.137 | | | | |
| S15 | Image plane | Spherical | Infinity | 0.000 | | | | |

Note:
The reference wavelength d-line is 587.6 nm

The fourth lens L4 has a negative refractive power. The object-side surface S7 of the fourth lens L4 is convex near the optical axis and is concave near a periphery of the object-side surface S7 of the fourth lens L4. The image-side surface S8 of the fourth lens L4 is concave near the optical axis and is convex near a periphery of the image-side surface S8 of the fourth lens L4.

The fifth lens L5 has a positive refractive power. The object-side surface S9 of the fifth lens L5 is convex near the optical axis and is concave near a periphery of the object-side surface S9 of the fifth lens L5. The image-side surface S10 of the fifth lens L5 is convex.

The sixth lens L6 has a negative refractive power. The object-side surface S11 of the sixth lens L6 is convex near the optical axis and is concave near a periphery of the object-side surface S11 of the sixth lens L6. The image-side surface S12 of the sixth lens L6 is concave near the optical axis and is convex near a periphery of image-side surface S12 of the sixth lens L6.

ETF represents an effective focal length of the optical system. FNO represents F-number of the optical system. FOV represents an angle of view of the optical system. TTL represents a distance from the object-side surface of the first lens to the image plane of the optical system on the optical axis.

In this implementation, the object-side surface and the image-side surface of each of the first to sixth lenses (L1, L2, L3, L4, L5, L6) are aspherical. A surface shape of each aspherical lens can be defined by but not limited to the following aspherical formula:

$$x = \frac{ch^2}{1 + \sqrt{1 - (k+1)c^2h^2}} + \sum A_i h^i$$

x represents a distance (sag) along the optical axis from a vertex of the aspherical surface to a position on the aspherical surface at a height h. c represents the paraxial curvature of the aspherical surface, and is the inverse of the Y radius (that is, c=1/R, where R represents the Y radius in the Table 1a). k represents the conic coefficient. Ai represents the i-th order correction coefficient of the aspherical surface. Table 1b shows higher-order coefficients A4, A6, A8, A10, A12, A14, A16, A18, and A20 of each of aspherical lens surfaces S1 to S10 in the optical system of FIG. 1a.

The third lens L3 has a negative refractive power. The object-side surface S5 of the third lens L3 is concave. The image-side surface S6 of the third lens L3 is concave near the optical axis and is convex near a periphery of the image-side surface S6 of the third lens L3.

The fourth lens L4 has a negative refractive power. The object-side surface S7 of the fourth lens L4 is convex. The TABLE 1b Optical system of FIG. 1a
Aspherical coefficients

| Surface Number | S1 | S2 | S3 | S4 | S5 | S6 |
|---|---|---|---|---|---|---|
| K   | 3.00E+01  | −6.58E−01 | −2.73E+00 | −1.01E+00 | −5.57E+00 | −3.27E+00 |
| A4  | 9.96E−01  | 1.44E+00  | −1.20E−02 | −4.74E−01 | −5.92E−01 | −4.77E−01 |
| A6  | −2.24E+00 | −2.10E−01 | 1.71E−01  | 8.86E−01  | 1.75E+00  | 5.18E−01  |
| A8  | 6.56E+00  | −8.58E+00 | −5.21E+00 | −7.16E+00 | −1.71E+01 | 3.41E+00  |
| A10 | −1.67E+01 | 6.46E+01  | −2.83E+01 | 1.99E+00  | 1.13E+02  | −2.18E+01 |
| A12 | 3.22E+01  | 5.18E+01  | 1.09E+03  | 2.66E+02  | −5.18E+02 | 5.97E+01  |
| A14 | −4.35E+01 | −1.94E+03 | −1.07E+04 | −1.76E+03 | 1.58E+03  | −9.37E+01 |
| A16 | 3.70E+01  | 8.35E+03  | 4.87E+04  | 5.20E+03  | −3.03E+03 | 8.72E+01  |
| A18 | −1.78E+01 | −1.50E+04 | −1.02E+05 | −7.56E+03 | 3.29E+03  | −4.48E+01 |
| A20 | 3.76E+00  | 9.74E+03  | 6.65E+04  | 4.30E+03  | −1.54E+03 | 9.73E+00  |

| Surface Number | S7 | S8 | S9 | S10 | S11 | S12 |
|---|---|---|---|---|---|---|
| K   | −3.38E+00 | −1.74E+01 | −2.52E+01 | −1.65E+00 | −2.63E+00 | −1.45E+00 |
| A4  | −4.87E−01 | −2.69E−01 | 7.20E−01  | 9.60E−01  | −8.03E−02 | −1.19E+00 |
| A6  | 1.61E−01  | −6.81E−01 | −3.23E+00 | −3.87E+00 | −3.32E+00 | 1.54E+00  |
| A8  | 6.57E+00  | 1.65E+00  | 9.12E+00  | 1.11E+01  | 9.12E+00  | −1.25E+00 |
| A10 | −2.85E+01 | −3.78E+00 | −1.80E+01 | −1.79E+01 | −1.22E+01 | 6.52E−01  |
| A12 | 5.94E+01  | 6.70E+00  | 2.39E+01  | 1.72E+01  | 9.42E+00  | −2.27E−01 |
| A14 | −7.21E+01 | −6.42E+00 | −2.07E+01 | −1.03E+01 | −4.38E+00 | 5.17E−02  |
| A16 | 5.26E+01  | 2.27E+00  | 1.11E+01  | 3.76E+00  | 1.21E+00  | −7.27E−03 |
| A18 | −2.15E+01 | 5.59E−01  | −3.25E+00 | −7.73E−01 | −1.84E−01 | 5.52E−04  |
| A20 | 3.81E+00  | −4.14E−01 | 3.97E−01  | 6.85E−02  | 1.18E−02  | −1.55E−05 |

FIG. 1b illustrates a longitudinal spherical aberration curve, an astigmatic field curve, and a distortion curve of the optical system of FIG. 1a. The longitudinal spherical aberration curve represents a focus deviation of each of light rays with different wavelengths after passing through each lens of the optical system. The astigmatic field curve represents a tangential field curvature and a sagittal field curvature. The distortion curve represents magnitudes of distortions corresponding to different field angles. As illustrated in FIG. 1b, the optical system of FIG. 1a can achieve good imaging quality.

Figure 2A:
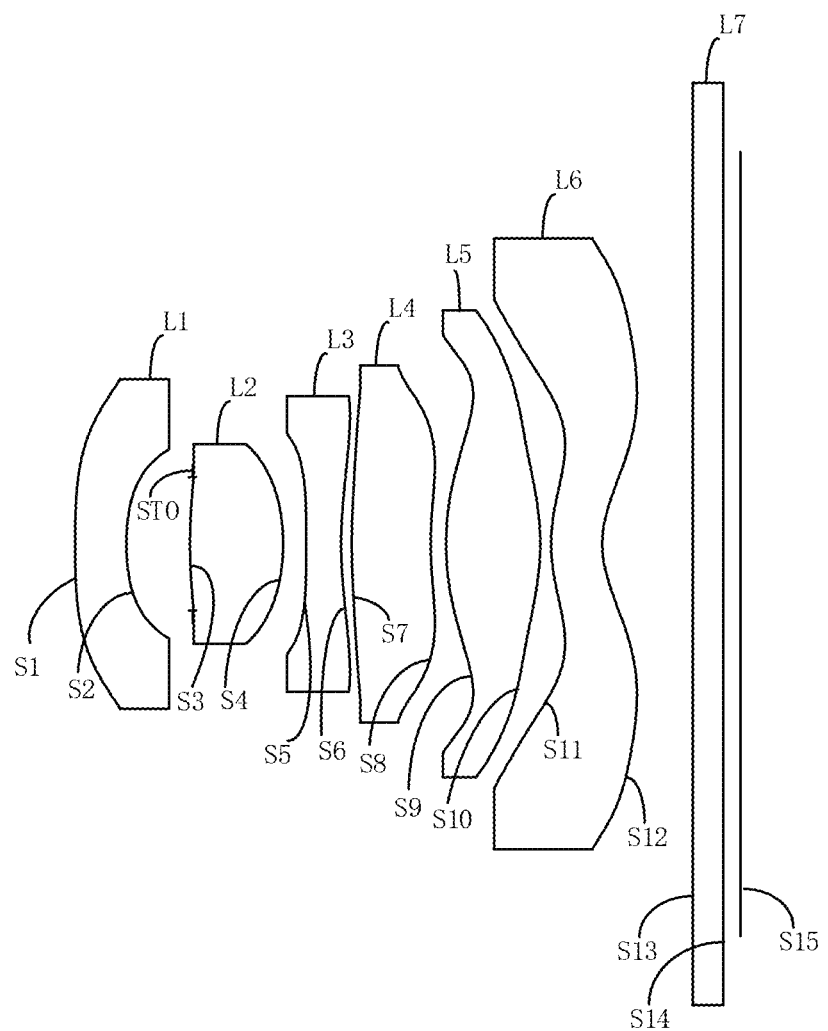
FIG. 2a is a schematic structural view of an optical system according to an implementation.
Figure 2B:
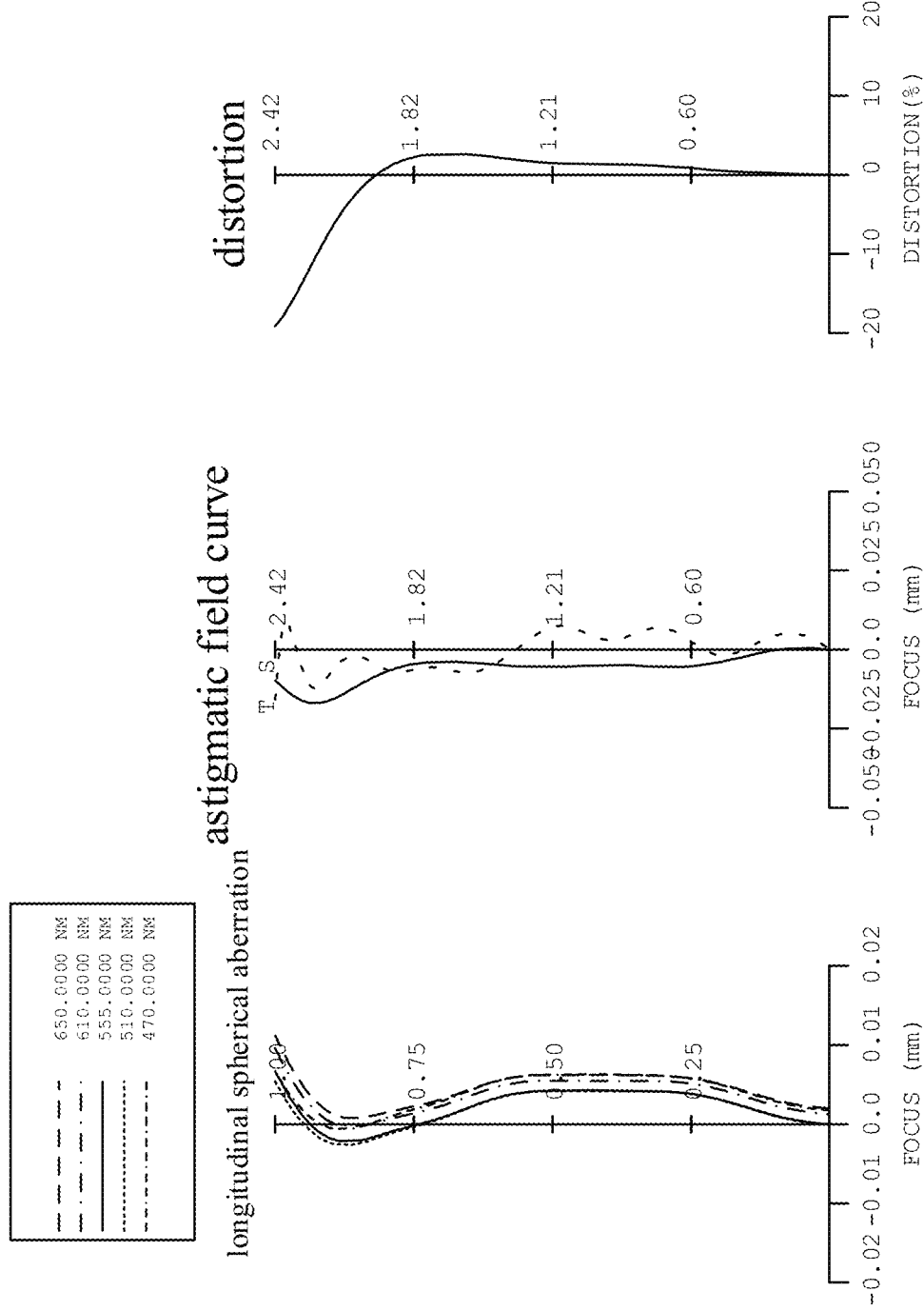

Referring to FIG. 2a and FIG. 2b, the optical system in this implementation includes, in order from the object side to the image side along the optical axis, the first lens L1, the second lens L2, the third lens L3, the fourth lens L4, the fifth lens L5, and the sixth lens L6.

The first lens L1 has a negative refractive power. The object-side surface S1 of the first lens L1 is convex. The image-side surface S2 of the first lens L1 is concave.

The second lens L2 has a positive refractive power. The object-side surface S3 of the second lens L2 is convex. The image-side surface S4 of the second lens L2 is convex.

image-side surface S8 of the fourth lens L4 is concave near the optical axis and is convex near a periphery of the image-side surface S8 of the fourth lens L4.

The fifth lens L5 has a positive refractive power. The object-side surface S9 of the fifth lens L5 is convex near the optical axis and is concave near a periphery of the object-side surface S9 of the fifth lens L5. The image-side surface S10 of the fifth lens L5 is convex.

The sixth lens L6 has a negative refractive power. The object-side surface S11 of the sixth lens L6 is convex near the optical axis and is concave near a periphery of the object-side surface S11 of the sixth lens L6. The image-side surface S12 of the sixth lens L6 is concave near the optical axis and is convex near a periphery of image-side surface S12 of the sixth lens L6.

The other structures of the optical system of FIG. 2a are identical with the optical system of FIG. 1a, reference can be made to the optical system of FIG. 1a.

Table 2a illustrates characteristics of the optical system in this implementation. Data in Table 2a is obtained based on light with a wavelength of 587.6 nm. Each of Y radius, thickness, and focal length is in units of millimeter (mm).

TABLE 2a

Optical system of FIG. 2a
EFL = 1.62, FNO = 2.3, HFOV = 61.52, TTL = 4.60

| Surface Number | Surface Name | Shape | Y Radius | Thickness | Material | Refractive Index | Abbe Number | Focal length |
|---|---|---|---|---|---|---|---|---|
| Object number | | Spherical | Infinity | 721.14 | | | | |
| S1 | First lens | Aspherical | 9.257 | 0.354 | Plastic | 1.545 | 55.93 | −2.71 |
| S2 | | Aspherical | 1.260 | 0.458 | | | | |
| STO | Stop | Spherical | Infinity | −0.018 | | | | |
| S3 | Second lens | Aspherical | 3.051 | 0.644 | Plastic | 1.545 | 55.93 | 1.56 |
| S4 | | Aspherical | −1.092 | 0.160 | | | | |
| S5 | Third lens | Aspherical | −23.002 | 0.241 | Plastic | 1.651 | 21.52 | −2.93 |
| S6 | | Aspherical | 2.106 | 0.074 | | | | |
| S7 | Fourth lens | Aspherical | 3.347 | 0.546 | Plastic | 1.545 | 55.93 | −12.45 |
| S8 | | Aspherical | 2.114 | 0.107 | | | | |
| S9 | Fifth lens | Aspherical | 1.663 | 0.651 | Plastic | 1.545 | 55.93 | 1.45 |
| S10 | | Aspherical | −1.299 | 0.075 | | | | |
| S11 | Sixth lens | Aspherical | 0.956 | 0.353 | Plastic | 1.639 | 23.26 | −3.55 |
| S12 | | Aspherical | 0.576 | 0.626 | | | | |
| S13 | Infrared cut-off filter | Spherical | Infinity | 0.210 | Glass | 1.517 | 64.17 | |
| S14 | | Spherical | Infinity | 0.120 | | | | |
| S15 | Image plane | Spherical | Infinity | 0.000 | | | | |

Note:
The reference wavelength d-line is 587.6 nm

Each parameter in Table 2a represents the same meaning as that in the optical system of FIG. 1a.

Table 2b shows higher-order coefficients that can be used for each aspherical lens surface in the optical system of FIG. 2a, where a shape of each aspherical lens surface can be defined by the formula given in the optical system of FIG. 1a.

TABLE 2b

Optical system of FIG. 2a
Aspherical coefficients

| Surface Number | S1 | S2 | S3 | S4 | S5 | S6 |
|---|---|---|---|---|---|---|
| K | −9.90E+01 | 1.36E+00 | −9.06E+00 | −7.82E−01 | 4.00E+01 | −4.21E+00 |
| A4 | 5.04E−01 | 8.65E−01 | −6.70E−02 | −4.42E−01 | −6.37E−01 | −5.70E−01 |
| A6 | −7.27E−01 | 5.79E−02 | 4.70E+00 | 1.68E+00 | 2.66E+00 | 2.62E+00 |
| A8 | 1.57E+00 | −5.54E−01 | −1.49E+02 | −2.39E+01 | −2.54E+01 | −1.04E+01 |
| A10 | −2.97E+00 | −8.12E+00 | 2.50E+03 | 1.91E+02 | 1.53E+02 | 2.78E+01 |
| A12 | 4.38E+00 | 3.10E+02 | −2.57E+04 | −1.01E+03 | −6.09E+02 | −4.92E+01 |
| A14 | −4.56E+00 | −2.05E+03 | 1.62E+05 | 3.44E+03 | 1.59E+03 | 5.66E+01 |
| A16 | 3.07E+00 | 6.50E+03 | −6.15E+05 | −7.35E+03 | −2.64E+03 | −4.05E+01 |
| A18 | −1.26E+00 | −1.01E+04 | 1.28E+06 | 8.96E+03 | 2.54E+03 | 1.63E+01 |
| A20 | 2.53E−01 | 5.90E+03 | −1.13E+06 | −4.84E+03 | −1.08E+03 | −2.84E+00 |

| Surface Number | S7 | S8 | S9 | S10 | S11 | S12 |
|---|---|---|---|---|---|---|
| K | −2.31E−01 | −8.37E+00 | −1.35E+01 | −1.43E+00 | −3.05E+00 | −1.47E+00 |
| A4 | −5.53E−01 | −2.78E−01 | 6.55E−01 | 4.65E−01 | −3.08E−01 | −1.08E+00 |
| A6 | 2.03E+00 | −1.28E+00 | −2.43E+00 | −7.66E−01 | −1.07E+00 | 1.29E+00 |
| A8 | −4.17E+00 | 5.40E+00 | 5.84E+00 | 1.57E+00 | 2.19E+00 | −1.17E+00 |
| A10 | 3.16E+00 | −1.36E+01 | −9.83E+00 | −2.48E+00 | −2.23E+00 | 7.94E−01 |
| A12 | 4.74E+00 | 2.25E+01 | 1.10E+01 | 2.27E+00 | 1.55E+00 | −3.72E−01 |
| A14 | −1.43E+01 | −2.38E+01 | −8.11E+00 | −1.19E+00 | −7.32E−01 | 1.14E−01 |
| A16 | 1.51E+01 | 1.55E+01 | 3.76E+00 | 3.53E−01 | 2.18E−01 | −2.18E−02 |
| A18 | −7.67E+00 | −5.50E+00 | −9.72E−01 | −5.39E−02 | −3.60E−02 | 2.33E−03 |
| A20 | 1.54E+00 | 8.08E−01 | 1.06E−01 | 3.21E−03 | 2.51E−03 | −1.05E−04 |

FIG. 2b illustrates a longitudinal spherical aberration curve, an astigmatic field curve, and a distortion curve of the optical system of FIG. 2a. In this implementation, the longitudinal spherical aberration curve represents deviations of focus points of lights of different wavelengths after passing through the lenses of the optical system. The astigmatic field curve represents a tangential field curvature and a sagittal field curvature. The distortion curve represents distortion values corresponding to different angles of view. As illustrated in FIG. 2b, the optical system of FIG. 2a can achieve good imaging quality.

Figure 3A:
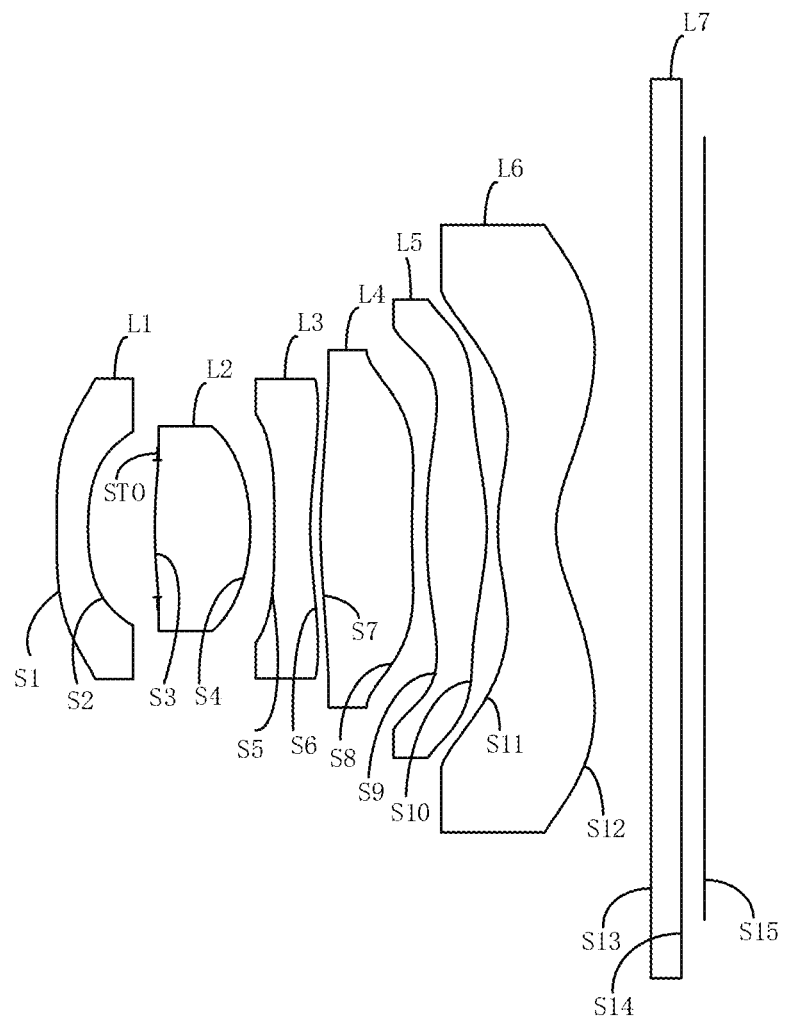
FIG. 3a is a schematic structural view of an optical system according to an implementation.
Figure 3B:
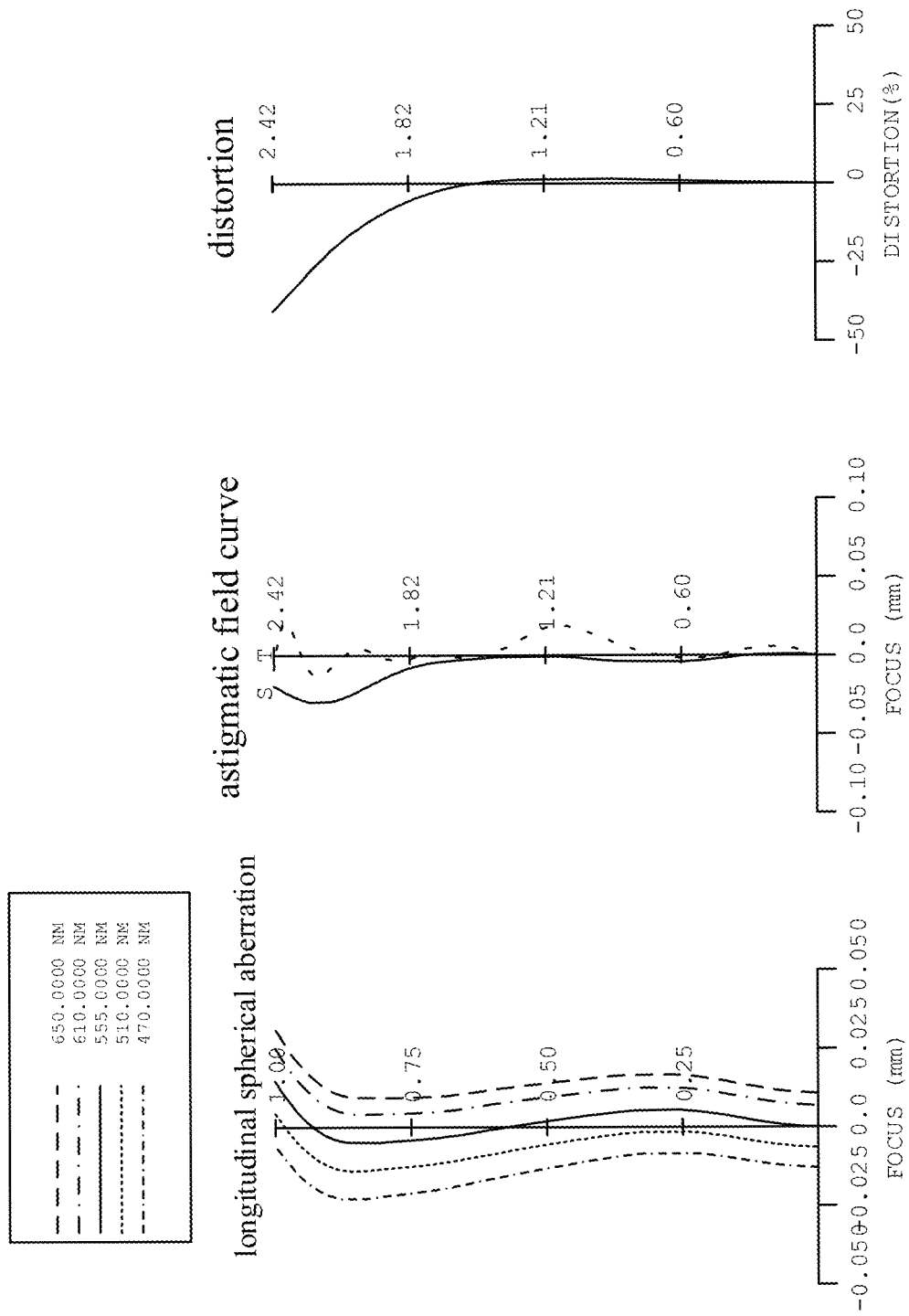

Referring to FIG. 3a and FIG. 3b, the optical system in this implementation includes, in order from the object side to the image side along the optical axis, the first lens L1, the second lens L2, the third lens L3, the fourth lens L4, the fifth lens L5, and the sixth lens L6.

The first lens L1 has a negative refractive power. The object-side surface S1 of the first lens L1 is convex. The image-side surface S2 of the first lens L1 is concave.

The second lens L2 has a positive refractive power. The object-side surface S3 of the second lens L2 is convex. The image-side surface S4 of the second lens L2 is convex.

The third lens L3 has a negative refractive power. The object-side surface S5 of the third lens L3 is concave. The image-side surface S6 of the third lens L3 is concave near the optical axis and is convex near a periphery of the image-side surface S6 of the third lens L3.

The fourth lens L4 has a positive refractive power. The object-side surface S7 of the fourth lens L4 is convex near the optical axis and is concave near a periphery of the image-side surface S7 of the fourth lens L4. The image-side surface S8 of the fourth lens L4 is concave near the optical axis and is convex near a periphery of the image-side surface S8 of the fourth lens L4.

The fifth lens L5 has a positive refractive power. The object-side surface S9 of the fifth lens L5 is convex near the optical axis and is concave near a periphery of the object-side surface S9 of the fifth lens L5. The image-side surface S10 of the fifth lens L5 is convex.

The sixth lens L6 has a negative refractive power. The object-side surface S11 of the sixth lens L6 is convex near the optical axis and is concave near a periphery of the object-side surface S11 of the sixth lens L6. The image-side surface S12 of the sixth lens L6 is concave near the optical axis and is convex near a periphery of image-side surface S12 of the sixth lens L6.

The other structures of the optical system of FIG. 3a are identical with the optical system of FIG. 1a, reference can be made to the optical system of FIG. 1a.

Table 3a illustrates characteristics of the optical system in this implementation. Data in Table 3a is obtained based on light with a wavelength of 587.6 nm. Each of Y radius, thickness, and focal length is in units of millimeter (mm).

TABLE 3a

Optical system of FIG. 3a
EFL = 1.73, FNO = 2.4, HFOV = 66.9, TTL = 4.457

| Surface Number | Surface Name | Shape | Y Radius | Thickness | Material | Refractive Index | Abbe Number | Focal length |
|---|---|---|---|---|---|---|---|---|
| Object number | | Spherical | Infinity | 707.00 | | | | |
| S1 | First lens | Aspherical | 80.000 | 0.215 | Plastic | 1.545 | 55.93 | −2.94 |
| S2 | | Aspherical | 1.574 | 0.477 | | | | |
| STO | Stop | Spherical | Infinity | −0.017 | | | | |
| S3 | Second lens | Aspherical | 3.192 | 0.657 | Plastic | 1.545 | 55.93 | 1.57 |
| S4 | | Aspherical | −1.086 | 0.165 | | | | |
| S5 | Third lens | Aspherical | −32.312 | 0.247 | Plastic | 1.661 | 20.37 | −2.60 |
| S6 | | Aspherical | 1.836 | 0.070 | | | | |
| S7 | Fourth lens | Aspherical | 2.731 | 0.630 | Plastic | 1.545 | 55.93 | 9.32 |
| S8 | | Aspherical | 5.414 | 0.102 | | | | |
| S9 | Fifth lens | Aspherical | 6.252 | 0.413 | Plastic | 1.636 | 23.97 | 1.65 |
| S10 | | Aspherical | −1.234 | 0.075 | | | | |
| S11 | Sixth lens | Aspherical | 1.322 | 0.400 | Plastic | 1.639 | 23.26 | −2.56 |
| S12 | | Aspherical | 0.647 | 0.654 | | | | |
| S13 | Infrared cut-off filter | Spherical | Infinity | 0.210 | Glass | 1.517 | 64.17 | |
| S14 | | Spherical | Infinity | 0.158 | | | | |
| S15 | Image plane | Spherical | Infinity | 0.000 | | | | |

Note:
The reference wavelength d-line is 587.6 nm

Each parameter in Table 3a represents the same meaning as that in the optical system of FIG. 1a.

Table 3b shows higher-order coefficients that can be used for each aspherical lens surface in the optical system of FIG. 3a, where a shape of each aspherical lens surface can be defined by the formula given in the optical system of FIG. 1a.

TABLE 3b

Optical system of FIG. 3a
Aspherical coefficients

| Surface Number | S1 | S2 | S3 | S4 | S5 | S6 |
|---|---|---|---|---|---|---|
| K | −4.77E+01 | 8.58E−01 | −7.07E+00 | −1.33E+00 | −4.00E+01 | −5.53E+00 |
| A4 | 9.49E−01 | 1.36E+00 | −6.22E−02 | −3.59E−01 | −6.67E−01 | −7.51E−01 |
| A6 | −2.51E+00 | −2.11E+00 | 2.99E+00 | −1.64E−01 | 2.48E+00 | 2.81E+00 |
| A8 | 8.74E+00 | 1.75E+01 | −9.35E+01 | 3.64E+00 | −1.90E+01 | −8.50E+00 |
| A10 | −2.56E+01 | −1.43E+02 | 1.51E+03 | −5.14E+01 | 1.15E+02 | 1.84E+01 |
| A12 | 5.38E+01 | 9.97E+02 | −1.50E+04 | 3.59E+02 | −4.82E+02 | −2.74E+01 |
| A14 | −7.50E+01 | −4.35E+03 | 9.16E+04 | −1.51E+03 | 1.30E+03 | 2.61E+01 |

TABLE 3b-continued

Optical system of FIG. 3a
Aspherical coefficients

| A16 | 6.49E+01 | 1.14E+04 | −3.38E+05 | 3.74E+03 | −2.19E+03 | −1.43E+01 |
| A18 | −3.14E+01 | −1.61E+04 | 6.88E+05 | −4.97E+03 | 2.09E+03 | 3.60E+00 |
| A20 | 6.54E+00 | 8.99E+03 | −5.96E+05 | 2.70E+03 | −8.68E+02 | −1.59E−01 |

| Surface Number | S7 | S8 | S9 | S10 | S11 | S12 |
|---|---|---|---|---|---|---|
| K | −3.39E+00 | −4.10E+00 | −4.00E+01 | −1.55E+00 | −2.41E+00 | −1.42E+00 |
| A4 | −5.39E−01 | 4.93E−02 | 8.89E−01 | 1.06E+00 | −9.18E−02 | −9.85E−01 |
| A6 | 1.68E+00 | −3.24E+00 | −4.08E+00 | −3.26E+00 | −2.50E+00 | 1.26E+00 |
| A8 | −3.19E+00 | 1.12E+01 | 1.07E+01 | 7.20E+00 | 6.35E+00 | −1.14E+00 |
| A10 | 2.53E+00 | −2.59E+01 | −1.96E+01 | −9.63E+00 | −8.11E+00 | 7.45E−01 |
| A12 | 2.69E+00 | 4.14E+01 | 2.50E+01 | 7.76E+00 | 6.23E+00 | −3.52E−01 |
| A14 | −9.32E+00 | −4.37E+01 | −2.14E+01 | −3.82E+00 | −2.98E+00 | 1.15E−01 |
| A16 | 1.06E+01 | 2.85E+01 | 1.15E+01 | 1.12E+00 | 8.69E−01 | −2.44E−02 |
| A18 | −5.74E+00 | −1.03E+01 | −3.43E+00 | −1.75E−01 | −1.42E−01 | 2.98E−03 |
| A20 | 1.23E+00 | 1.53E+00 | 4.27E−01 | 1.11E−02 | 9.84E−03 | −1.58E−04 |

FIG. 3b illustrates a longitudinal spherical aberration curve, an astigmatic field curve, and a distortion curve of the optical system of FIG. 3a. The longitudinal spherical aberration curve represents a focus deviation of each of light rays with different wavelengths after passing through each lens of the optical system. The astigmatic field curve represents a tangential field curvature and a sagittal field curvature. The distortion curve represents distortion values corresponding to different angles of view. As illustrated in FIG. 3b, the optical system of FIG. 3a can achieve good imaging quality.

Figure 4A:
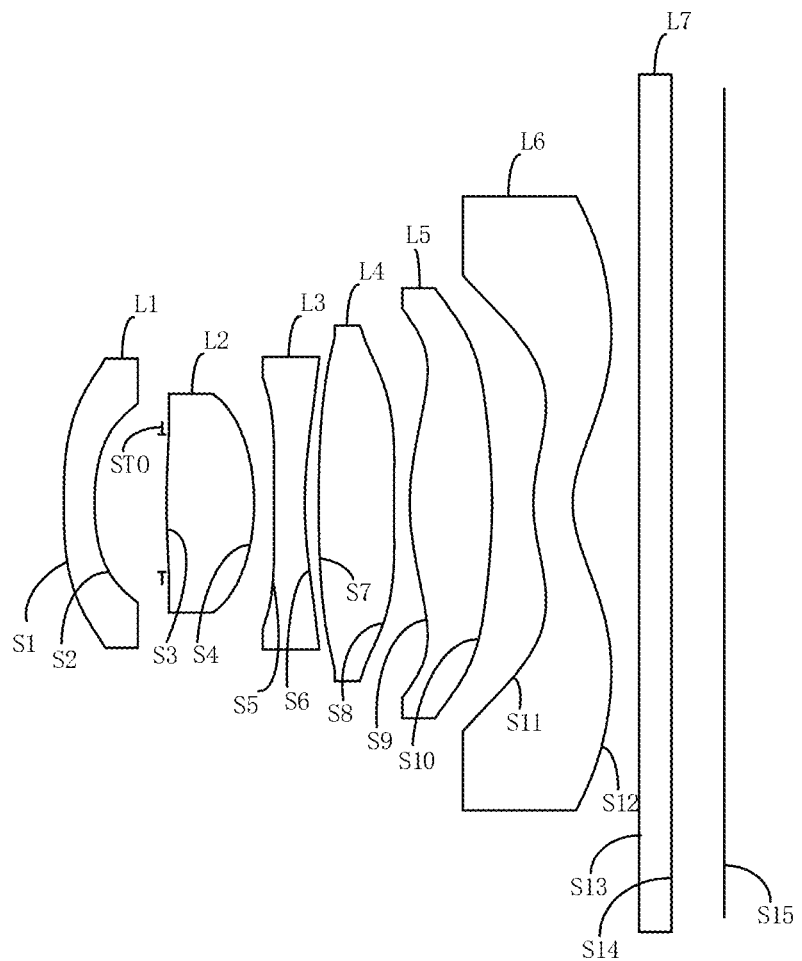
FIG. 4a is a schematic structural view of an optical system according to an implementation.
Figure 4B:
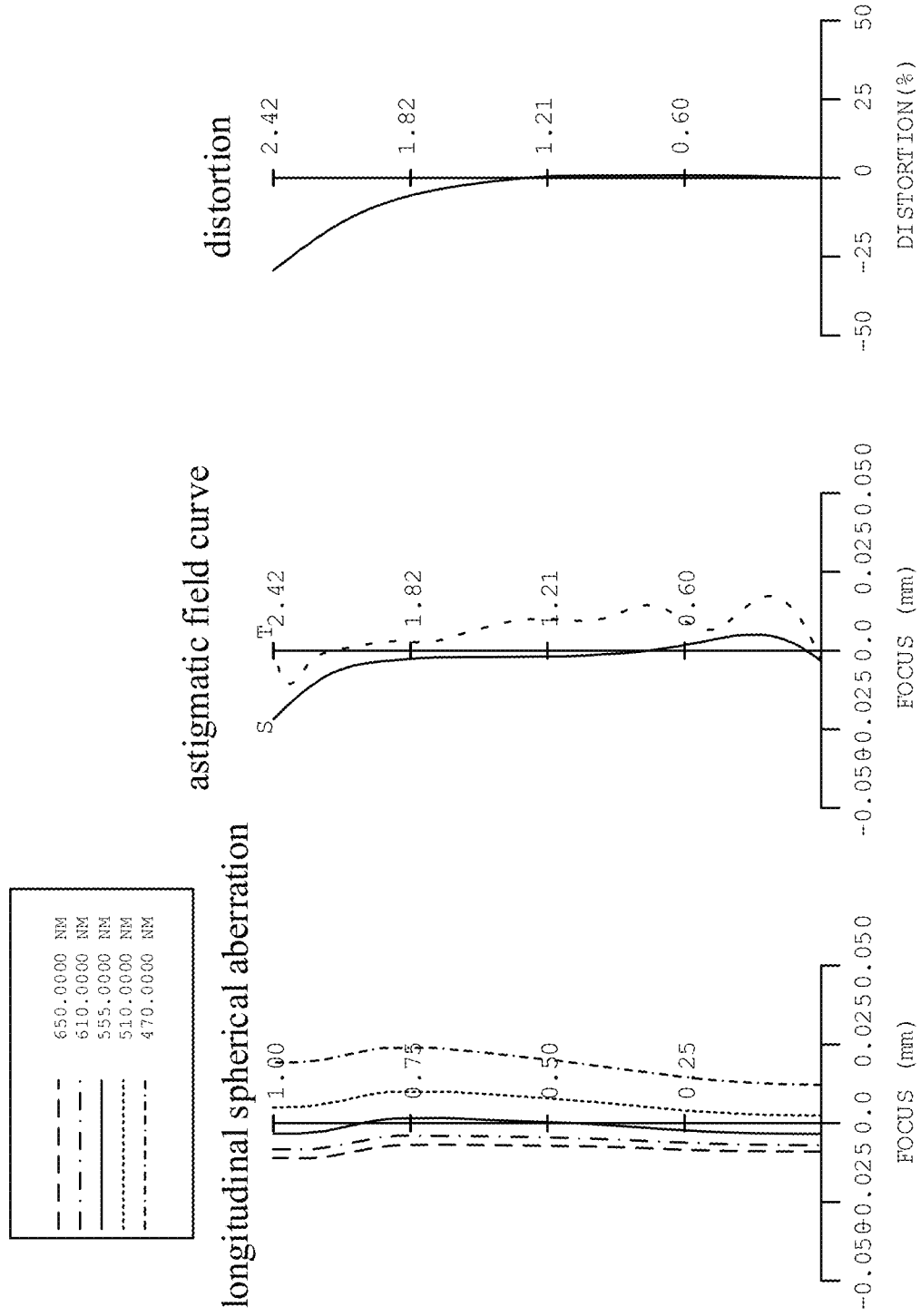

Referring to FIG. 4a and FIG. 4b, the optical system in this implementation includes, in order from the object side to the image side along the optical axis, the first lens L1, the second lens L2, the third lens L3, the fourth lens L4, the fifth lens L5, and the sixth lens L6.

The first lens L1 has a negative refractive power. The object-side surface S1 of the first lens L1 is convex. The image-side surface S2 of the first lens L1 is concave.

The second lens L2 has a positive refractive power. The object-side surface S3 of the second lens L2 is convex near the optical axis and is concave near a periphery of the object-side surface S3 of the second lens L2. The image-side surface S4 of the second lens L2 is convex.

The third lens L3 has a negative refractive power. The object-side surface S5 of the third lens L3 is convex near the optical axis and is concave near a periphery of the object-side surface S5 of the third lens L3. The image-side surface S6 of the third lens L3 is concave.

The fourth lens L4 has a negative refractive power. The object-side surface S7 of the fourth lens L4 is convex. The image-side surface S8 of the fourth lens L4 is concave near the optical axis and is convex near a periphery of the image-side surface S8 of the fourth lens L4.

The fifth lens L5 has a positive refractive power. The object-side surface S9 of the fifth lens L5 is convex near the optical axis and is concave near a periphery of the object-side surface S9 of the fifth lens L5. The image-side surface S10 of the fifth lens L5 is convex.

The sixth lens L6 has a negative refractive power. The object-side surface S11 of the sixth lens L6 is convex near the optical axis and is concave near a periphery of the object-side surface S11 of the sixth lens L6. The image-side surface S12 of the sixth lens L6 is concave near the optical axis and is convex near a periphery of image-side surface S12 of the sixth lens L6.

The other structures of the optical system of FIG. 4a are identical with the optical system of FIG. 1a, reference can be made to the optical system of FIG. 1a.

Table 4a illustrates characteristics of the optical system in this implementation. Data in Table 4a is obtained based on light with a wavelength of 587.6 nm. Each of Y radius, thickness, and focal length is in units of millimeter (mm).

TABLE 4a

Optical system of FIG. 4a
EFL = 1.73, FNO = 2.45, HFOV = 63.2, TTL = 4.295

| Surface Number | Surface Name | Shape | Y Radius | Thickness | Material | Refractive Index | Abbe Number | Focal length |
|---|---|---|---|---|---|---|---|---|
| Object number | | Spherical | Infinity | 402.00 | | | | |
| S1 | First lens | Aspherical | 4.413 | 0.200 | Plastic | 1.636 | 23.97 | −2.93 |
| S2 | | Aspherical | 1.293 | 0.439 | | | | |
| STO | Stop | Spherical | Infinity | 0.030 | | | | |
| S3 | Second lens | Aspherical | 4.550 | 0.569 | Plastic | 1.545 | 55.93 | 1.78 |
| S4 | | Aspherical | −1.177 | 0.128 | | | | |
| S5 | Third lens | Aspherical | 10.892 | 0.201 | Plastic | 1.661 | 20.37 | −4.14 |
| S6 | | Aspherical | 2.187 | 0.091 | | | | |
| S7 | Fourth lens | Aspherical | 13.434 | 0.489 | Plastic | 1.545 | 55.93 | −23.80 |
| S8 | | Aspherical | 6.520 | 0.103 | | | | |

TABLE 4a-continued

Optical system of FIG. 4a
EFL = 1.73, FNO = 2.45, HFOV = 63.2, TTL = 4.295

| Surface Number | Surface Name | Shape | Y Radius | Thickness | Material | Refractive Index | Abbe Number | Focal length |
|---|---|---|---|---|---|---|---|---|
| S9 | Fifth lens | Aspherical | 1.243 | 0.535 | Plastic | 1.545 | 55.93 | 1.73 |
| S10 | | Aspherical | −3.335 | 0.269 | | | | |
| S11 | Sixth lens | Aspherical | 0.860 | 0.256 | Plastic | 1.651 | 21.52 | −3.54 |
| S12 | | Aspherical | 0.554 | 0.431 | | | | |
| S13 | Infrared cut-off filter | Spherical | Infinity | 0.210 | Glass | 1.517 | 64.17 | |
| S14 | | Spherical | Infinity | 0.345 | | | | |
| S15 | Image surface | Spherical | Infinity | 0.000 | | | | |

Note:
The reference wavelength d-line is 587.6 nm

Each parameter in Table 4a represents the same meaning as that in the optical system of FIG. 1a.

Table 4b shows higher-order coefficients that can be used for each aspherical lens surface in the optical system of FIG. 4a, where a shape of each aspherical lens surface can be defined by the formula given in the optical system of FIG. 1a.

TABLE 4b

Optical system of FIG. 4a
Aspherical coefficients

| Surface Number | S1 | S2 | S3 | S4 | S5 | S6 |
|---|---|---|---|---|---|---|
| K | −1.62E+01 | 1.05E+00 | −3.31E+00 | 2.40E−01 | −3.70E+01 | −1.44E+01 |
| A4 | 7.95E−01 | 1.14E+00 | −1.08E−02 | −1.72E−01 | −4.17E−01 | −1.66E−03 |
| A6 | −1.48E+00 | −9.69E−01 | −2.29E+00 | −1.26E+00 | −3.02E−01 | −1.01E+00 |
| A8 | 3.99E+00 | 6.65E−01 | 3.74E+01 | 1.84E+01 | 8.02E+00 | 5.79E+00 |
| A10 | −8.95E+00 | 7.75E+01 | −4.34E+02 | −1.54E+02 | −4.35E+01 | −1.66E+01 |
| A12 | 1.34E+01 | −8.36E+02 | 2.87E+03 | 6.91E+02 | 1.15E+02 | 2.68E+01 |
| A14 | −8.63E+00 | 4.78E+03 | −1.10E+04 | −1.80E+03 | −1.68E+02 | −2.43E+01 |
| A16 | −7.11E+00 | −1.50E+04 | 2.27E+04 | 2.54E+03 | 1.34E+02 | 1.11E+01 |
| A18 | 1.42E+01 | 2.42E+04 | −1.97E+04 | −1.55E+O3 | −4.42E+01 | −1.79E+00 |
| A20 | −5.99E+00 | −1.59E+04 | 0.00E+00 | 0.00E+00 | 0.00E+00 | 0.00E+00 |

| Surface Number | S7 | S8 | S9 | S10 | S11 | S12 |
|---|---|---|---|---|---|---|
| K | 8.93E+01 | 2.32E+01 | −5.86E+00 | −2.94E+01 | −6.76E+00 | −2.58E+00 |
| A4 | 2.90E−01 | −8.15E−01 | −2.85E−01 | −1.08E−01 | −3.26E−01 | −6.29E−01 |
| A6 | −9.47E−01 | 1.82E+00 | 8.38E−01 | 7.93E−01 | −1.10E+00 | 7.26E−01 |
| A8 | 1.38E+00 | −5.08E+00 | −2.51E+00 | −2.59E+00 | 3.48E+00 | −6.31E−01 |
| A10 | 1.65E+00 | 1.14E+01 | 4.58E+00 | 4.42E+00 | −6.22E+00 | 4.01E−01 |
| A12 | −1.04E+01 | −1.90E+01 | −5.92E+00 | −4.89E+00 | 7.11E+00 | −1.75E−01 |
| A14 | 1.92E+01 | 2.21E+01 | 5.21E+00 | 3.59E+00 | −5.04E+00 | 5.05E−02 |
| A16 | −1.85E+01 | −1.66E+01 | −3.00E+00 | −1.68E+00 | 2.12E+00 | −9.24E−03 |
| A18 | 9.49E+00 | 7.17E+00 | 1.07E+00 | 4.60E−01 | −4.84E−01 | 9.78E−04 |
| A20 | −2.06E+00 | −1.38E+00 | −1.80E−01 | −5.65E−02 | 4.54E−02 | −4.59E−05 |

FIG. 4b illustrates a longitudinal spherical aberration curve, an astigmatic field curve, and a distortion curve of the optical system of FIG. 4a. The longitudinal spherical aberration curve represents a focus deviation of each of light rays with different wavelengths after passing through each lens of the optical system. The astigmatic field curve represents a tangential field curvature and a sagittal field curvature. The distortion curve represents distortion values corresponding to different angles of view. As illustrated in FIG. 4b, the optical system of FIG. 4a can achieve good imaging quality.

Figure 5A:
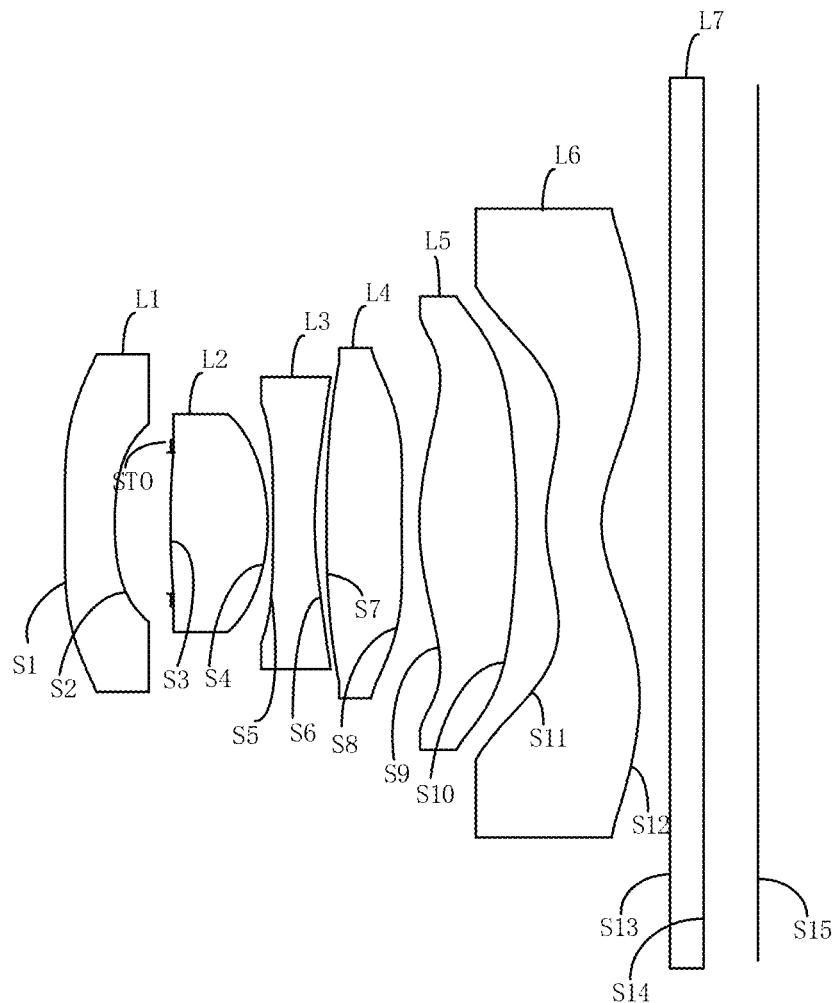
FIG. 5a is a schematic structural view of an optical system according to an implementation.
Figure 5B:
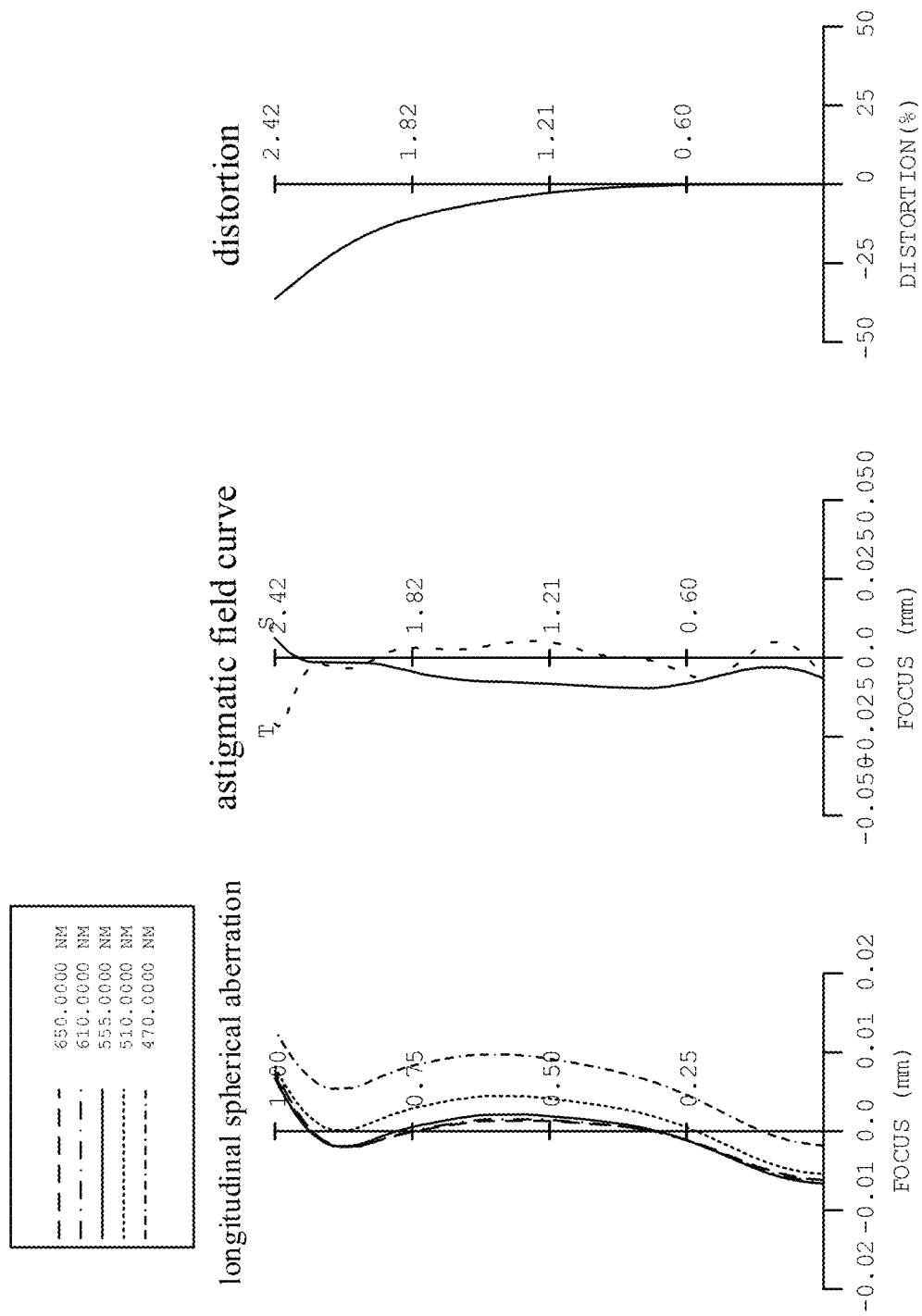

Referring to FIG. 5a and FIG. 5b, the optical system in this implementation includes, in order from the object side to the image side along the optical axis, the first lens L1, the second lens L2, the third lens L3, the fourth lens L4, the fifth lens L5, and the sixth lens L6.

The first lens L1 has a negative refractive power. The object-side surface S1 of the first lens L1 is concave near the optical axis and is convex near a periphery of the object-side surface S1 of the first lens L1. The image-side surface S2 of the first lens L1 is concave.

The second lens L2 has a positive refractive power. The object-side surface S3 of the second lens L2 is convex. The image-side surface S4 of the second lens L2 is convex.

The third lens L3 has a negative refractive power. The object-side surface S5 of the third lens L3 is convex near the optical axis and is concave near a periphery of the object-side surface S5 of the third lens L3. The image-side surface S6 of the third lens L3 is concave.

The fourth lens L4 has a negative refractive power. The object-side surface S7 of the fourth lens L4 is convex. The image-side surface S8 of the fourth lens L4 is concave near the optical axis and is convex near a periphery of the image-side surface S8 of the fourth lens L4.

The fifth lens L5 has a positive refractive power. The object-side surface S9 of the fifth lens L5 is convex near the optical axis and is concave near a periphery of the object-side surface S9 of the fifth lens L5. The image-side surface S10 of the fifth lens L5 is convex.

The sixth lens L6 has a negative refractive power. The object-side surface S11 of the sixth lens L6 is convex near the optical axis and is concave near a periphery of the object-side surface S11 of the sixth lens L6. The image-side surface S12 of the sixth lens L6 is concave near the optical axis and is convex near a periphery of image-side surface S12 of the sixth lens L6.

The other structures of the optical system of FIG. 5a are identical with the optical system of FIG. 1a, reference can be made to the optical system of FIG. 1a.

Table 5a illustrates characteristics of the optical system in this implementation. Data in Table 5a is obtained based on light with a wavelength of 587.6 nm. Each of Y radius, thickness, and focal length is in units of millimeter (mm).

TABLE 5a

Optical system of FIG. 5a
EFL = 1.71, FNO = 2.44, HFOV = 65.6, TTL = 4.332

| Surface Number | Surface Name | Shape | Y Radius | Thickness | Material | Refractive Index | Abbe Number | Focal length |
|---|---|---|---|---|---|---|---|---|
| Object number | | Spherical | Infinity | 400.00 | | | | |
| S1 | First lens | Aspherical | −19.907 | 0.312 | Plastic | 1.545 | 55.93 | −2.92 |
| S2 | | Aspherical | 1.741 | 0.350 | | | | |
| STO | Stop | Spherical | Infinity | −0.002 | | | | |
| S3 | Second lens | Aspherical | 4.188 | 0.608 | Plastic | 1.545 | 55.93 | 1.57 |
| S4 | | Aspherical | −1.024 | 0.033 | | | | |
| S5 | Third lens | Aspherical | 411.468 | 0.261 | Plastic | 1.661 | 20.37 | −3.12 |
| S6 | | Aspherical | 2.066 | 0.073 | | | | |
| S7 | Fourth lens | Aspherical | 12.729 | 0.470 | Plastic | 1.567 | 37.40 | −21.34 |
| S8 | | Aspherical | 6.135 | 0.110 | | | | |
| S9 | Fifth lens | Aspherical | 1.279 | 0.609 | Plastic | 1.545 | 55.93 | 1.89 |
| S10 | | Aspherical | −4.407 | 0.183 | | | | |
| S11 | Sixth lens | Aspherical | 0.905 | 0.347 | Plastic | 1.651 | 21.52 | −5.00 |
| S12 | | Aspherical | 0.602 | 0.427 | | | | |
| S13 | Infrared cut-off filter | Spherical | Infinity | 0.210 | Glass | 1.517 | 64.17 | |
| S14 | | Spherical | Infinity | 0.341 | | | | |
| S15 | Image plane | Spherical | Infinity | 0.000 | | | | |

Note:
The reference wavelength d-line is 587.6 nm

Each parameter in Table 5a represents the same meaning as that in the optical system of FIG. 1a.

Table 5b shows higher-order coefficients that can be used for each aspherical lens surface in the optical system of FIG. 5a, where a shape of each aspherical lens surface can be defined by the formula given in the optical system of FIG. 1a.

TABLE 5b

Optical system of FIG. 5a
Aspherical coefficients

| Surface Number | S1 | S2 | S3 | S4 | S5 | S6 |
|---|---|---|---|---|---|---|
| K | 9.90E+01 | 2.26E+00 | 1.86E+01 | −6.94E−02 | −9.90E+01 | −1.37E+01 |
| A4 | 6.68E−01 | 1.20E+00 | −4.28E−02 | −2.25E−01 | −5.44E−01 | −1.70E−02 |
| A6 | −1.29E+00 | −2.13E+00 | 1.82E+00 | 1.17E+00 | 1.83E+00 | −7.26E−01 |
| A8 | 3.32E+00 | 2.61E+01 | −6.29E+01 | −5.05E+00 | −9.27E+00 | 4.74E+00 |
| A10 | −7.72E+00 | −2.60E+02 | 9.77E+02 | −3.42E+01 | 2.91E+01 | −1.71E+01 |
| A12 | 1.37E+01 | 1.93E+03 | −9.14E+03 | 3.69E+02 | −5.07E+01 | 3.84E+01 |
| A14 | −1.70E+01 | −8.94E+03 | 4.95E+04 | −1.48E+03 | 1.37E+01 | −5.27E+01 |
| A16 | 1.34E+01 | 2.54E+04 | −1.43E+05 | 2.87E+03 | 1.02E+02 | 4.08E+01 |
| A18 | −6.10E+00 | −4.10E+04 | 1.69E+05 | −2.24E+03 | −1.15E+02 | −1.35E+01 |
| A20 | 1.24E+00 | 2.84E+04 | 0.00E+00 | 0.00E+00 | 0.00E+00 | 0.00E+00 |

| Surface Number | S7 | S8 | S9 | S10 | S11 | S12 |
|---|---|---|---|---|---|---|
| K | 5.77E+01 | 1.66E+01 | −4.46E+00 | −1.71E+01 | −6.13E+00 | −2.45E+00 |
| A4 | 2.76E−01 | −7.36E−01 | −2.26E−01 | −2.58E−01 | −4.37E−01 | −6.32E−01 |
| A6 | −1.15E+00 | 1.40E+00 | 6.31E−01 | 1.73E+00 | −3.47E−01 | 6.98E−01 |
| A8 | 4.20E+00 | −4.33E+00 | −1.96E+00 | −5.29E+00 | 8.84E−01 | −5.75E−01 |

TABLE 5b-continued

Optical system of FIG. 5a
Aspherical coefficients

| A10 | −1.10E+01 | 1.08E+01 | 3.07E+00 | 8.73E+00 | −1.39E+00 | 3.34E−01 |
| A12 | 1.90E+01 | −1.76E+01 | −2.70E+00 | −8.84E+00 | 1.57E+00 | −1.28E−01 |
| A14 | −2.06E+01 | 1.73E+01 | 1.03E+00 | 5.45E+00 | −9.94E−01 | 3.02E−02 |
| A16 | 1.26E+01 | −9.13E+00 | 3.85E−02 | −1.86E+00 | 3.19E−01 | −4.02E−03 |
| A18 | −3.35E+00 | 1.99E+00 | −8.46E−02 | 2.71E−01 | −4.07E−02 | 2.33E−04 |
| A20 | 0.00E+00 | 0.00E+00 | 0.00E+00 | 0.00E+00 | 0.00E+00 | 0.00E+00 |

FIG. 5b illustrates a longitudinal spherical aberration curve, an astigmatic field curve, and a distortion curve of the optical system of FIG. 5a. The longitudinal spherical aberration curve represents a focus deviation of each of light rays with different wavelengths after passing through each lens of the optical system. The astigmatic field curve represents a tangential field curvature and a sagittal field curvature. The distortion curve represents distortion values corresponding to different angles of view. As illustrated in FIG. 5b, the optical system of FIG. 5a can achieve good imaging quality.

Figure 6A:
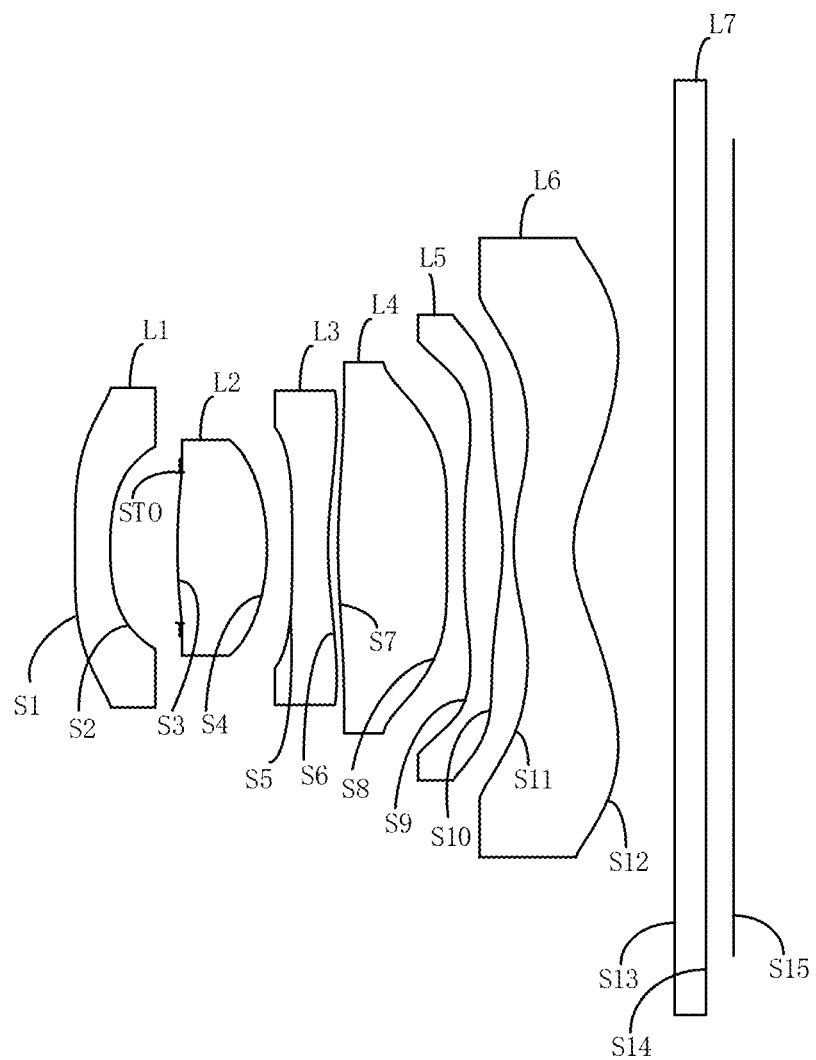
FIG. 6a is a schematic structural view of an optical system according to an implementation.
Figure 6B:
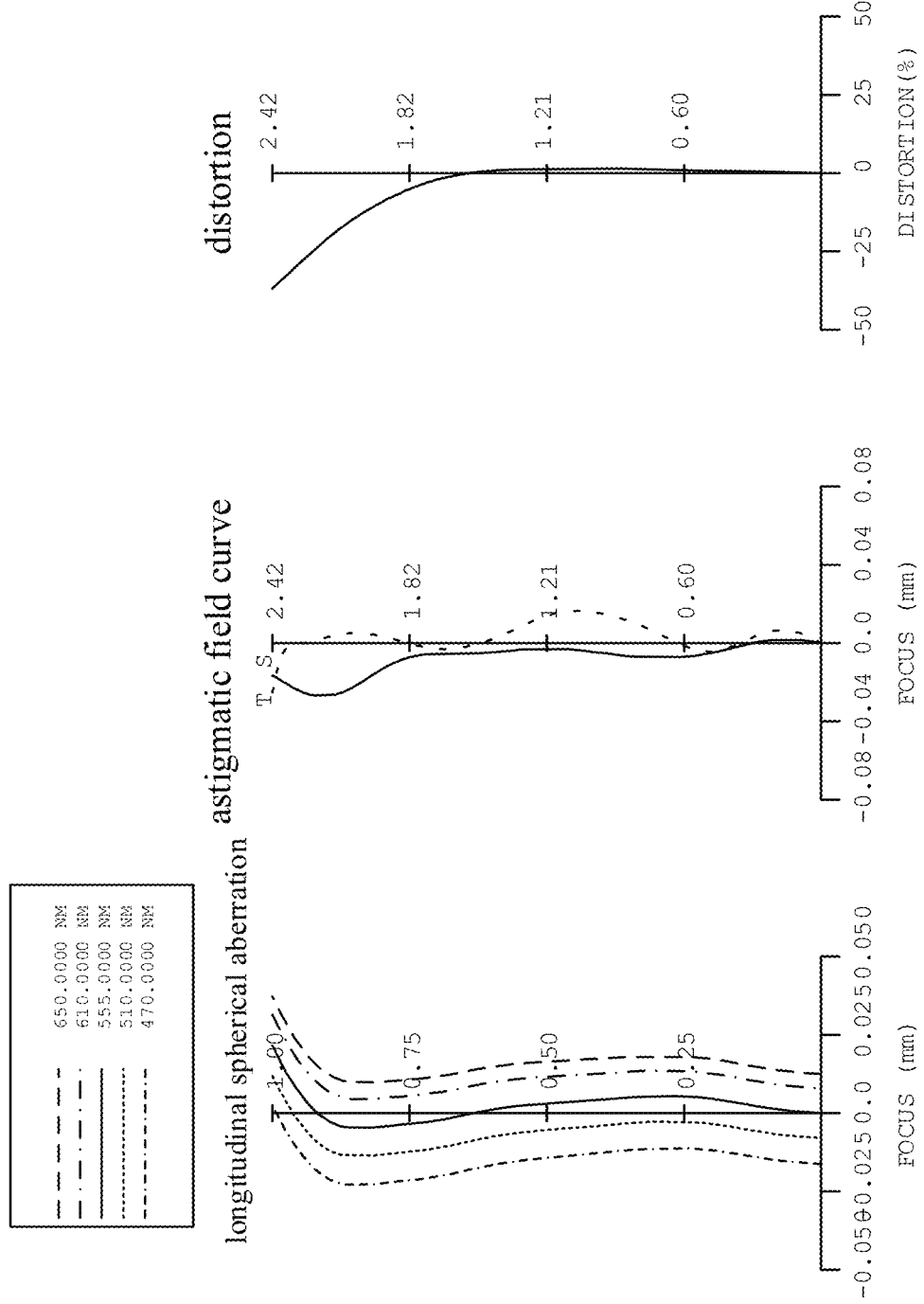

Referring to FIG. 6a and FIG. 6b, the optical system in this implementation includes, in order from the object side to the image side along the optical axis, the first lens L1, the second lens L2, the third lens L3, the fourth lens L4, the fifth lens L5, and the sixth lens L6.

The first lens L1 has a negative refractive power. The object-side surface S1 of the first lens L1 is concave near the optical axis and is convex near a periphery of the object-side surface S1 of the first lens L1. The image-side surface S2 of the first lens L1 is concave.

The second lens L2 has a positive refractive power. The object-side surface S3 of the second lens L2 is convex. The image-side surface S4 of the second lens L2 is convex.

The third lens L3 has a negative refractive power. The object-side surface S5 of the third lens L3 is convex near the optical axis and is concave near a periphery of the object-side surface S5 of the third lens L3. The image-side surface S6 of the third lens L3 is concave near the optical axis and is convex near a periphery of the image-side surface S6 of the third lens L3.

The fourth lens L4 has a positive refractive power. The object-side surface S7 of the fourth lens L4 is convex near the optical axis and is concave near a periphery of the object-side surface S7. The image-side surface S8 of the fourth lens L4 is convex.

The fifth lens L5 has a positive refractive power. The object-side surface S9 of the fifth lens L5 is convex near the optical axis and is concave near a periphery of the object-side surface S9 of the fifth lens L5. The image-side surface S10 of the fifth lens L5 is convex.

The sixth lens L6 has a negative refractive power. The object-side surface S11 of the sixth lens L6 is convex near the optical axis and is concave near a periphery of the object-side surface S11 of the sixth lens L6. The image-side surface S12 of the sixth lens L6 is concave near the optical axis and is convex near a periphery of image-side surface S12 of the sixth lens L6.

The other structures of the optical system of FIG. 6a are identical with the optical system of FIG. 1a, reference can be made to the optical system of FIG. 1a.

Table 6a illustrates characteristics of the optical system in this implementation. Data in Table 6a is obtained based on light with a wavelength of 587.6 nm. Each of Y radius, thickness, and focal length is in units of millimeter (mm).

TABLE 6a

Optical system of FIG. 6a
EFL = 1.67, FNO = 2.20, HFOV = 66.4, TTL = 4.409

| Surface Number | Surface Name | Shape | Y Radius | Thickness | Material | Refractive Index | Abbe Number | Focal length |
|---|---|---|---|---|---|---|---|---|
| Object number | | Spherical | Infinity | 707.00 | | | | |
| S1 | First lens | Aspherical | −18.524 | 0.235 | Plastic | 1.545 | 55.93 | −2.87 |
| S2 | | Aspherical | 1.722 | 0.467 | | | | |
| STO | Stop | Spherical | Infinity | −0.017 | | | | |
| S3 | Second lens | Aspherical | 3.217 | 0.600 | Plastic | 1.545 | 55.93 | 1.71 |
| S4 | | Aspherical | −1.226 | 0.168 | | | | |
| S5 | Third lens | Aspherical | 23.589 | 0.241 | Plastic | 1.661 | 20.37 | −2.92 |
| S6 | | Aspherical | 1.792 | 0.067 | | | | |
| S7 | Fourth lens | Aspherical | 3.182 | 0.730 | Plastic | 1.545 | 55.93 | 5.65 |
| S8 | | Aspherical | −90.764 | 0.115 | | | | |
| S9 | Fifth lens | Aspherical | 31.036 | 0.257 | Plastic | 1.636 | 23.97 | 2.03 |
| S10 | | Aspherical | −1.351 | 0.075 | | | | |
| S11 | Sixth lens | Aspherical | 1.117 | 0.400 | Plastic | 1.639 | 23.26 | −3.74 |
| S12 | | Aspherical | 0.656 | 0.678 | | | | |
| S13 | Infrared cut-off filter | Spherical | Infinity | 0.210 | Glass | 1.517 | 64.17 | |
| S14 | | Spherical | Infinity | 0.183 | | | | |
| S15 | Image plane | Spherical | Infinity | 0.000 | | | | |

Note:
The reference wavelength d-line is 587.6 nm

Each parameter in Table 6a represents the same meaning as that in the optical system of FIG. 1a.

Table 6b shows higher-order coefficients that can be used for each aspherical lens surface in the optical system of FIG. 6a, where a shape of each aspherical lens surface can be defined by the formula given in the optical system of FIG. 1a.

distortion curve represents distortion values corresponding to different angles of view. As illustrated in FIG. 6b, the optical system of FIG. 6a can achieve good imaging quality.

Table 7 shows values of $f4/|f1|$, $\tan(\text{HFOV})/\text{SD}11$, $f2/f5$, $f1/f6$, $CT2/(T12+T23)$, $vd6-vd3$, $R12/R13$, $CT5/|\text{SAG}51|$, and $(CT1+CT3+CT4)/TTL$ of the optical systems of FIGS.

TABLE 6b

Optical system of FIG. 6a
Aspherical coefficients

| Surface Number | S1 | S2 | S3 | S4 | S5 | S6 |
| --- | --- | --- | --- | --- | --- | --- |
| K | 9.90E+01 | 1.37E+00 | −2.21E+00 | −1.52E+00 | −2.24E+01 | −5.50E+00 |
| A4 | 9.54E−01 | 1.33E+00 | −7.11E−02 | −3.92E−01 | −7.63E−01 | −8.68E−01 |
| A6 | −2.54E+00 | −1.04E+00 | 3.89E+00 | 9.91E−01 | 4.05E+00 | 4.26E+00 |
| A8 | 8.29E+00 | −2.07E+00 | −1.06E+02 | −7.20E+00 | −2.89E+01 | −1.65E+01 |
| A10 | −2.25E+01 | 2.14E+01 | 1.56E+03 | 5.57E+00 | 1.50E+02 | 4.46E+01 |
| A12 | 4.44E+01 | 1.92E+02 | −1.40E+04 | 1.82E+02 | −5.43E+02 | −8.18E+01 |
| A14 | −5.94E+01 | −1.92E+03 | 7.72E+04 | −1.18E+03 | 1.32E+03 | 9.87E+01 |
| A16 | 5.02E+01 | 6.77E+03 | −2.58E+05 | 3.34E+03 | −2.06E+03 | −7.42E+01 |
| A18 | −2.40E+01 | −1.09E+04 | 4.75E+05 | −4.62E+03 | 1.86E+03 | 3.14E+01 |
| A20 | 5.00E+00 | 6.43E+03 | −3.73E+05 | 2.48E+03 | −7.47E+02 | −5.67E+00 |

| Surface Number | S7 | S8 | S9 | S10 | S11 | S12 |
| --- | --- | --- | --- | --- | --- | --- |
| K | −2.82E+00 | −9.90E+01 | −4.06E+00 | −1.56E+00 | −2.22E+00 | −1.37E+00 |
| A4 | −5.29E−01 | −6.64E−02 | 1.05E+00 | 1.13E+00 | −2.31E−01 | −8.90E−01 |
| A6 | 2.30E+00 | −2.37E+00 | −4.54E+00 | −3.31E+00 | −1.81E+00 | 1.05E+00 |
| A8 | −7.55E+00 | 6.42E+00 | 1.09E+01 | 6.99E+00 | 5.21E+00 | −8.58E−01 |
| A10 | 1.71E+01 | −1.02E+01 | −1.91E+01 | −9.27E+00 | −6.96E+00 | 5.04E−01 |
| A12 | −2.65E+01 | 1.12E+01 | 2.42E+01 | 7.49E+00 | 5.43E+00 | −2.17E−01 |
| A14 | 2.71E+01 | −7.87E+00 | −2.11E+01 | −3.70E+00 | −2.60E+00 | 6.56E−02 |
| A16 | −1.69E+01 | 2.46E+00 | 1.15E+01 | 1.09E+00 | 7.55E−01 | −1.30E−02 |
| A18 | 5.62E+00 | 4.13E−01 | −3.48E+00 | −1.72E−01 | −1.22E−01 | 1.50E−03 |
| A20 | −7.47E−01 | −3.44E−01 | 4.37E−01 | 1.09E−02 | 8.34E−03 | −7.44E−05 |

FIG. 6b illustrates a longitudinal spherical aberration curve, an astigmatic field curve, and a distortion curve of the optical system of FIG. 6a. The longitudinal spherical aberration curve represents a focus deviation of each of light rays with different wavelengths after passing through each lens of the optical system. The astigmatic field curve represents a tangential field curvature and a sagittal field curvature. The distortion curve represents distortion values corresponding to different angles of view. As illustrated in Table 7, each of the implementations of the present disclosure satisfies the following expressions. $-9 < f4/|f1| < 3.5$. $1.7 < \tan(\text{HFOV})/\text{SD}11 < 2.6$. $0.7 < f2/f5 < 1.5$. $0.5 < f1/f6 < 1.5$. $0.8 < CT2/(T12+T23) < 1.6$. $0.5 < vd6-vd3 < 4.5$. $1.2 < R12/R13 < 2.5$. $CT5/|\text{SAG}51| > 1$. $0.2 < (CT1+CT3+CT4)/TTL < 0.3$.

TABLE 7

| | $-9 < f4/|f1| < 3.5$ | $1.7 < \tan(\text{HFOV})/\text{SD}11 < 2.6$ | $0.7 < f2/f5 < 1.5$ |
| --- | --- | --- | --- |
| Optical system of FIG. 1a | −1.793 | 2.247 | 1.426 |
| Optical system of FIG. 2a | −4.594 | 1.807 | 1.076 |
| Optical system of FIG. 3a | 3.17 | 2.507 | 0.952 |
| Optical system of FIG. 4a | −8.123 | 2.34 | 1.029 |
| Optical system of FIG. 5a | −7.308 | 2.327 | 0.831 |
| Optical system of FIG. 6a | 1.958 | 2.39 | 0.842 |

| | $0.5 < f1/f6 < 1.5$ | $0.8 < CT2/(T12+T23) < 1.6$ | $0.5 < vd6-vd3 < 4.5$ |
| --- | --- | --- | --- |
| Optical system of FIG. 1a | 1.380 | 0.92 | 3.6 |
| Optical system of FIG. 2a | 0.764 | 1.04 | 1.74 |
| Optical system of FIG. 3a | 1.148 | 1.02 | 2.89 |
| Optical system of FIG. 4a | 0.828 | 1 | 1.15 |
| Optical system of FIG. 5a | 0.584 | 1.59 | 1.15 |
| Optical system of FIG. 6a | 0.767 | 0.94 | 2.89 |

| | $1.2 < R12/R13 < 2.5$ | $CT5/|\text{SAG}51| > 1$ | $0.2 < (CT1+CT3+CT4)/TTL < 0.3$ |
| --- | --- | --- | --- |
| Optical system of FIG. 1a | 2.20 | 4.28 | 0.226 |
| Optical system of FIG. 2a | 1.66 | 31.00 | 0.248 |
| Optical system of FIG. 3a | 2.04 | 1.82 | 0.245 |
| Optical system of FIG. 4a | 1.55 | 11.38 | 0.207 |

TABLE 7-continued

| | | | |
|---|---|---|---|
| Optical system of FIG. 5a | 1.50 | 60.90 | 0.241 |
| Optical system of FIG. 6a | 1.70 | 0.85 | 0.273 |

Preferred implementations of the present disclosure have been described above, which cannot be understood as limitations on the present disclosure. Those skilled in the art can appreciate all or part of processes of carrying out the above-mentioned implementations, make equivalent changes based on the claims of the present disclosure, and these equivalent changes are also considered to fall into the protection scope of the present disclosure.

What is claimed is:

1. An optical system comprising, in order from an object side to an image side along an optical axis:
    a first lens with a negative refractive power;
    a second lens with a positive refractive power;
    a third lens with a negative refractive power;
    a fourth lens with a refractive power;
    a fifth lens with a positive refractive power, wherein the fifth lens has an object-side surface which is convex near the optical axis and concave near a periphery of the object-side surface of the fifth lens, the object-side surface of the fifth lens has at least one inflection point;
    a sixth lens with a negative refractive power, wherein the sixth lens has an object-side surface which is convex near the optical axis and concave near a periphery of the object-side surface of the sixth lens, and an image-side surface which is concave near the optical axis and convex near a periphery of the image-side surface of the sixth lens, and wherein at least one of the object-side surface and the image-side surface of the sixth lens has at least one inflection point; and
    the optical system satisfies the following expression:

$-9<f4/|f1|<3.5$;

wherein f1 represents an effective focal length of the first lens, f4 represents an effective focal length of the fourth lens, and
    wherein an object-side surface and an image-side surface of each of the first lens to the sixth lens are rotationally symmetric.

2. The optical system of claim 1, wherein the optical system satisfies the following expression:

$1.7<\tan(HFOV)/SD11<2.6$;

wherein HFOV represents half of a maximum angle of view of the optical system, SD11 represents half of a clear aperture of an object-side surface of the first lens.

3. The optical system of claim 1, wherein the optical system satisfies the following expression:

$0.7<f2/f5<1.5$;

wherein f2 represents an effective focal length of the second lens, f5 represents an effective focal length of the fifth lens.

4. The optical system of claim 1, wherein the optical system satisfies the following expression:

$0.5<f1/f6<1.5$;

wherein f1 represents an effective focal length of the first lens, f6 represents an effective focal length of the sixth lens.

5. The optical system of claim 1, wherein the optical system satisfies the following expression:

$0.8<CT2/(T12+T23)<1.6$;

wherein CT2 represents a thickness of the second lens on the optical axis, T12 represents a distance between the first lens and the second lens on the optical axis, and T23 represents a distance between the second lens and the third lens on the optical axis.

6. The optical system of claim 1, wherein the optical system satisfies the following expression:

$0.5<vd6-vd3<4.5$;

wherein vd6 represents an Abbe number of the sixth lens, and vd3 represents an Abbe number of the third lens.

7. The optical system of claim 1, wherein the optical system satisfies the following expression:

$1.2<R12/R13<2.5$;

wherein R12 represents a radius of curvature of the object-side surface of the sixth lens, and R13 represents a radius of curvature of the image-side surface of the sixth lens.

8. The optical system of claim 1, wherein the optical system satisfies the following expression:

$CT5/|SAG51|>0.85$;

wherein CT5 represents a thickness of the fifth lens on the optical axis, SAG51 represents an offset on the optical axis between a vertex on the optical axis of the object-side surface of the fifth lens and the object-side surface of the fifth lens at a maximum effective radius thereof.

9. The optical system of claim 1, wherein the optical system satisfies the following expression:

$0.2<(CT1+CT3+CT4)/TTL<0.3$;

wherein CT1 represents a center thickness of the first lens on the optical axis, CT3 represents a center thickness of the third lens on the optical axis, CT4 represents a center thickness of the fourth lens on the optical axis, and TTL represents a distance from an object-side surface of the first lens to an image plane of the optical system on the optical axis.

10. An optical system comprising, in order from an object side to an image side along an optical axis:
    a first lens with a negative refractive power;
    a second lens with a positive refractive power;
    a third lens with a negative refractive power;
    a fourth lens with a refractive power;
    a fifth lens with a positive refractive power, wherein the fifth lens has an object-side surface which is convex near the optical axis and concave near a periphery of the object-side surface of the fifth lens, the object-side surface of the fifth lens has at least one inflection point;
    a sixth lens with a negative refractive power, wherein the sixth lens has an object-side surface which is convex near the optical axis and concave near a periphery of the object-side surface of the sixth lens, and an image-side surface which is concave near the optical axis and convex near a periphery of the image-side surface of the sixth lens, and wherein at least one of the object-side surface and the image-side surface of the sixth lens has at least one inflection point; and wherein the optical system satisfies the following expressions:

$$1.7<\tan(\mathrm{HFOV})/SD11<2.6;$$

wherein HFOV represents half of a maximum angle of view of the optical system, SD11 represents half of a clear aperture of an object-side surface of the first lens; and $$0.226<(CT1+CT3+CT4)/TTL<0.3;$$

wherein CT1 represents a center thickness of the first lens on the optical axis, CT3 represents a center thickness of the third lens on the optical axis, CT4 represents a center thickness of the fourth lens on the optical axis, and TTL represents a distance from an object-side surface of the first lens to an image plane of the optical system on the optical axis.

11. The optical system of claim 10, wherein the optical system satisfies the following expression:

$$0.7<f2/f5<1.5;$$

wherein f2 represents an effective focal length of the second lens, f5 represents an effective focal length of the fifth lens.

12. The optical system of claim 10, wherein the optical system satisfies the following expression:

$$0.5<f1/f6<1.5;$$

wherein f1 represents an effective focal length of the first lens, f6 represents an effective focal length of the sixth lens.

13. The optical system of claim 10, wherein the optical system satisfies the following expression:

$$0.8<CT2/(T12+T23)<1.6;$$

wherein CT2 represents a thickness of the second lens on the optical axis, T12 represents a distance between the first lens and the second lens on the optical axis, and T23 represents a distance between the second lens and the third lens on the optical axis.

14. The optical system of claim 10, wherein the optical system satisfies the following expression:

$$0.5<vd6-vd3<4.5;$$

wherein vd6 represents an Abbe number of the sixth lens, and vd3 represents an Abbe number of the third lens.

15. The optical system of claim 10, wherein the optical system satisfies the following expression:

$$1.2<R12/R13<2.5;$$

wherein R12 represents a radius of curvature of the object-side surface of the sixth lens, and R13 represents a radius of curvature of the image-side surface of the sixth lens.

16. The optical system of claim 10, wherein the optical system satisfies the following expression:

$$CT5/|SAG51|>0.85;$$

wherein CT5 represents a thickness of the fifth lens on the optical axis, SAG51 represents an offset on the optical axis between a vertex on the optical axis of the object-side surface of the fifth lens and the object-side surface of the fifth lens at a maximum effective radius thereof.

17. An optical system comprising, in order from an object side to an image side along an optical axis:

a first lens with a negative refractive power;
a second lens with a positive refractive power;
a third lens with a negative refractive power;
a fourth lens with a refractive power;
a fifth lens with a positive refractive power, wherein the fifth lens has an object-side surface which is convex near the optical axis and concave near a periphery of the object-side surface of the fifth lens, the object-side surface of the fifth lens has at least one inflection point;
a sixth lens with a negative refractive power, wherein the sixth lens has an object-side surface which is convex near the optical axis and concave near a periphery of the object-side surface of the sixth lens, and an image-side surface which is concave near the optical axis and convex near a periphery of the image-side surface of the sixth lens, and wherein at least one of the object-side surface and the image-side surface of the sixth lens has at least one inflection point; and
the optical system satisfies the following expressions:

$$-9<f4/|f1|<3.5;$$

wherein f1 represents an effective focal length of the first lens, f4 represents an effective focal length of the fourth lens; and $$CT5/|SAG51|>0.85;$$

wherein CT5 represents a thickness of the fifth lens on the optical axis, SAG51 represents an offset on the optical axis between a vertex on the optical axis of the object-side surface of the fifth lens and the object-side surface of the fifth lens at a maximum effective radius thereof;
wherein the first to sixth lenses of the optical system are received in the lens barrel; and
wherein the lens module and the electronic photosensitive element are received in the housing, and the electronic photosensitive element is disposed on an image plane of the optical system and configured to convert light passing through the first to sixth lenses and incident on the electronic photosensitive element into an electrical signal of an image.

18. The optical system of claim 17, wherein the optical system satisfies the following expression:

$$1.7<\tan(\mathrm{HFOV})/SD11<2.6;$$

wherein HFOV represents half of a maximum angle of view of the optical system, SD11 represents half of a clear aperture of an object-side surface of the first lens.

19. The optical system of claim 17, wherein the optical system satisfies the following expression:

$$0.5<vd6-vd3<4.5;$$

wherein vd6 represents an Abbe number of the sixth lens, and vd3 represents an Abbe number of the third lens.

20. The optical system of claim 17, wherein the optical system satisfies the following expression:

$$0.2<(CT1+CT3+CT4)/TTL<0.3;$$

wherein CT1 represents a center thickness of the first lens on the optical axis, CT3 represents a center thickness of the third lens on the optical axis, CT4 represents a center thickness of the fourth lens on the optical axis, and TTL represents a distance from an object-side surface of the first lens to an image plane of the optical system on the optical axis.

* * * * *